United States Patent
Lu et al.

(10) Patent No.: US 10,869,262 B2
(45) Date of Patent: Dec. 15, 2020

(54) METHOD AND DEVICE FOR TRANSMITTING SYSTEM INFORMATION, BASE STATION AND USER EQUIPMENT

(71) Applicant: BAICELLS TECHNOLOGIES CO. LTD., Beijing (CN)

(72) Inventors: Yang Lu, Beijing (CN); Lixin Sun, Beijing (CN); Yingzhe Ding, Beijing (CN)

(73) Assignee: Baicells Technologies Co. Ltd., Beijing (CN)

( * ) Notice: Subject to any disclaimer, the term of this patent is extended or adjusted under 35 U.S.C. 154(b) by 40 days.

(21) Appl. No.: 16/304,603

(22) PCT Filed: May 16, 2017

(86) PCT No.: PCT/CN2017/084521
§ 371 (c)(1),
(2) Date: Nov. 26, 2018

(87) PCT Pub. No.: WO2017/202228
PCT Pub. Date: Nov. 30, 2017

(65) Prior Publication Data
US 2019/0274094 A1 Sep. 5, 2019

(30) Foreign Application Priority Data
May 27, 2016 (CN) .......................... 2016 1 0366233

(51) Int. Cl.
*H04W 72/04* (2009.01)
*H04W 48/16* (2009.01)
(Continued)

(52) U.S. Cl.
CPC ........... *H04W 48/16* (2013.01); *H04L 5/0051* (2013.01); *H04L 5/0085* (2013.01); *H04W 24/10* (2013.01);
(Continued)

(58) Field of Classification Search
None
See application file for complete search history.

(56) References Cited

U.S. PATENT DOCUMENTS 10,292,093 B2 * 5/2019 Chendamarai Kannan ................. H04W 8/005
2014/0293908 A1 10/2014 Kumar et al.

FOREIGN PATENT DOCUMENTS

| CN | 101651490 A | 2/2010 |
| CN | 102369745 A | 3/2012 |

(Continued)

OTHER PUBLICATIONS

1st Office Action for Chinese Application No. 201610366233.2, dated May 27, 2019—6 pages (plus Translation—6 pages).

*Primary Examiner* — Willie J Daniel, Jr.
(74) *Attorney, Agent, or Firm* — Culhane Meadows PLLC; Stephen J. Weed

(57) ABSTRACT

A method and a device for transmitting SI, a base station and a UE are provided. The method includes: determining a position of an SI window corresponding to each piece of SI, and determining a configuration parameter of each SI window in accordance with the position of the SI window; transmitting a DRS to a UE, the configuration parameter of each SI window being carried in an eSIB in the DRS; and transmitting the SI to the UE through each SI window. Each SI window corresponds to one piece of SI, and parts of the SI windows are configured in a radio link measurement window for a serving cell to which the UE belongs.

17 Claims, 7 Drawing Sheets

(51) Int. Cl.
 *H04W 76/11* (2018.01)
 *H04L 5/00* (2006.01)
 *H04W 24/10* (2009.01)
 *H04W 52/02* (2009.01)

(52) U.S. Cl.
 CPC ... *H04W 52/0206* (2013.01); *H04W 52/0229* (2013.01); *H04W 72/042* (2013.01); *H04W 72/0446* (2013.01); *H04W 76/11* (2018.02); *Y02D 30/70* (2020.08)

(56) References Cited

FOREIGN PATENT DOCUMENTS

| | | | | |
|---|---|---|---|---|
| CN | 104219767 A | * | 12/2014 | ............ H04W 48/12 |
| CN | 104219767 A | | 12/2014 | |
| CN | 105228240 A | | 1/2016 | |

* cited by examiner

METHOD AND DEVICE FOR TRANSMITTING SYSTEM INFORMATION, BASE STATION AND USER EQUIPMENT

CROSS-REFERENCE TO RELATED APPLICATION

The present application is the U.S. national phase of PCT Application No. PCT/CN2017/084521 filed on May 16, 2017, which claims a priority of the Chinese patent application No. 201610366233.2 filed on May 27, 2016, which are incorporated herein by reference in their entirety.

TECHNICAL FIELD

The present disclosure relates to the field of communication technology, in particular to a method and a device for transmitting system information, a base station and a user equipment (UE).

BACKGROUND

MulteFire (MF), as a new Long Term Evolution (LTE)-based radio access technology, is capable of being used individually in an unlicensed spectrum without the aid of carriers at a licensed frequency band. For the MF technology, an LTE system is extended to the unlicensed spectrum, and a Listen Before Talk (LBT) mechanism, similar to a Wireless Fidelity (WiFi) carrier monitoring technology, has been introduced into a physical layer, so as to enable an MF device to achieve fair competition for a channel resource at an unlicensed frequency band with a WiFi device. When a base station or a UE has monitored that a channel at the unlicensed frequency band has been occupied (i.e., the LBT mechanism has been performed unsuccessfully), the transmission of the signal may be stopped, and when the base station or the UE has monitored that the channel is in an idle state (i.e., the LBT mechanism has been performed successfully), the signal may be transmitted.

In order to increase the transmission efficiency of downlink common control signals for the base station under the LBT mechanism, a Discovery Reference Signal (DRS) has been introduced into the MF technology. The DRS includes the main downlink common control signals, e.g., system broadcast, Primary Synchronous Signal (PSS), Secondary Synchronous Signal (SSS), enhanced PSS (ePSS), enhanced SSS (eSSS), Cell Reference Signal (CRS), Master Information Block (MIB) and enhanced SIB (eSIB). 12 or 14 symbols are occupied by the DRS within a downlink subframe, and the DRS is transmitted within a DRS Transmission Window (DTxW). When the LBT mechanism is performed successfully at the base station, the base station may transmit the DRS once within the DTxW. The DTxW has a length of 1ms to 10 ms. The base station may probably transmit the DRS within any subframe in the DTxW in accordance with an LBT result. A minimum period of the DTxW is 40 ms, and the period must be an integral multiple of 40 ms. The UE detects the DRS within the DTxW for downlink synchronization, so as to receive the MIB and the eSIB.

In the LTE system, the CRS is transmitted by the base station within each downlink subframe, and each subframe may serve as a sample for the detection and measurement of a radio link. The UE estimates downlink channel quality through measuring Reference Signal Received Quality (RSRQ) of the CRS. In an MF system, the CRS is merely transmitted by the base station within a subframe where the DRS is transmitted or a subframe where a Physical Downlink Shared Channel (PDSCH) is transmitted. FIG. 1 shows the detection of the CRS by the UE in the MF system.

In addition, a Discovery Signals Measurement Timing Configuration (DMTC) has also been introduced into the MF technology. The DMTC is adopted to indicate the UE to measure the reference signals for a serving cell and a neighboring cell within DMTC windows occurring periodically, so as to monitor the radio link quality, or perform cell selection, cell reselection or cell handover. The base station may configure a separate DMTC for an MF serving cell, an MF neighboring cell at a same frequency as the MF serving cell, and an MF neighboring cell at a frequency different from the MF serving cell. For the MF system, it is merely able to ensure the transmission of the CRS within the DRS subframe in the DTxW, so the DMTC window for each frequency point or cell must include the DRS subframe in a corresponding frequency point or cell, so as to ensure the measurement of the CRS within the DRS subframe in the frequency point or cell. The DMTC window has a length of 1ms to 10 ms. The UE merely measures the radio link quality within the DMTCs for the serving cell, the neighboring cell at a same frequency with the serving cell and the neighboring cell at a different frequency from the serving cell.

In the LTE system, each piece of System Information (SI) is merely transmitted within an SI window. One piece of SI is associated with one SI window, and the SI is merely transmitted within the corresponding SI window (i.e., the other pieces of SI cannot be transmitted within this SI window) and may be transmitted repeatedly. The transmission times of the SI within the SI window and the subframes within which the SI is transmitted depend on the implementation of the base station. All the SI windows for the pieces of SI have a same length. When the pieces of SI corresponding to two windows are to be transmitted one after another, the SI windows may be located one after another immediately, i.e., the SI windows do not overlap each other and no gap exits therebetween. Periods of different pieces of SI are configured separately.

The length of each SI window is designated by a field si-WindowLength of SystemInformationBlockType1 in SIB1, in units of ms. A list of the SI is designated by a field schedulingInfoList of SystemInformationBlockType1, and a serial number of each piece of SI is represented by n in the list (starting from 1). When four pieces of SI have been designated in schedulingInfoList, four consecutive SI windows may be used to transmit the four pieces of SI, and n represents a corresponding SI window within which the SI is to be transmitted. At this time, for each piece of SI, a start subframe offset may be calculated through the following formula $x=(n-1)*w$, where w represents the length of the SI window, and x represents the start subframe offset in units of ms. A start frame (SFN) of the SI window may meet the condition SFN % T=FLOOR(x/10), and a number (a) of the start subframe of the SI window may meet the condition a=X % 10, where T represents the period of the corresponding SI and it is designated by the period of the SI (in units of 10 ms). Through SFN % T, it is able to ensure the period of the SI, and through FLOOR(x/10), it is able to ensure the start radio frame offset of the SI window in the period of the SI. One radio frame has a length of 10 ms.

The start frame and the start subframe of the SI window in the period of the SI depend on x. Through SFN % T, it is able to ensure that the SI window merely occurs once in the period of the SI, and through $x=(n-1)*w$, it is able to ensure that the SI windows do not overlap each other and no gap exists therebetween.

Upon the determination of the SI window, the base station may determine the transmission times of the SI within each SI window, and the transmission times may vary along with the implementations of the base station. However, the SIB1 needs to be transmitted within a subframe #5 of a radio frame where SFN %2=0, so the SI is incapable of being transmitted within the subframe #5.

For the SI windows starting from SFN0, each SI window may have a length of 1ms, 2 ms, 5 ms, 10 ms, 15 ms, 20 ms or 40 ms, and the period of the SI may be 80 ms, 160 ms, 320 ms, 640 ms, 1280 ms, 2560 ms or 5120 ms. The UE in the idle state detects an SI-Radio Network Temporary Identity (SI-RNTI) within each subframe of the SI window, and receives the SI. Each SI window may be configured at any position in accordance with the period of the SI.

In the LTE system, the UE in the idle state may measure the radio link within any subframe, and the time periods for the measurement of the radio link performed by the UEs may be different from each other, so it is impossible to save the power no matter where the SI window is configured. However, for a radio communication system where the CRS is transmitted intermittently (e.g., an MF system), all the UEs in the cell merely measure the radio link within a designated time window. When a conventional configuration of the SI is applied to this kind of system, it is necessary for the UE to enable a receiver beyond a radio link measurement window, and thereby the power consumption of the UE may increase.

SUMMARY

An object of the present disclosure is to provide a method and a device for transmitting system information, a base station and a UE, so as to reduce the power consumption of the UE when it is necessary for the UE to enable the receiver beyond the radio link measurement window.

In one aspect, the present disclosure provides in some embodiments a method for transmitting SI for use in a base station, including: determining a position of an SI window corresponding to each piece of SI, and determining a configuration parameter of each SI window in accordance with the position of the SI window; transmitting a DRS to a UE, the configuration parameter of each SI window being carried in an eSIB in the DRS; and transmitting the SI to the UE through each SI window, each SI window corresponding to one piece of SI, and parts of the SI windows being configured in a radio link measurement window for a serving cell to which the UE belongs.

In another aspect, the present disclosure provides a device for transmitting SI for use in a base station, including: a first processing module configured to determine a position of an SI window corresponding to each piece of SI, and determine a configuration parameter of each SI window in accordance with the position of the SI window; a first transmission module configured to transmit a DRS to a UE, the configuration parameter of each SI window being carried in an eSIB in the DRS; and a second transmission module configured to transmit the SI to the UE through each SI window, each SI window corresponding to one piece of the SI windows being configured in a radio link measurement window for a serving cell to which the UE belongs.

In yet another aspect, the present disclosure provides in some embodiments a base station, including: a processor configured to determine a position of an SI window corresponding to each piece of SI, and determine a configuration parameter of each SI window in accordance with the position of the SI window; and a transmitter connected to the processor and configured to transmit a DRS to a UE, the configuration parameter of each SI window being carried in an eSIB in the DRS. The transmitter is further configured to transmit the SI to the UE through each SI window, each SI window corresponds to one piece of SI, and parts of the SI windows are configured in a radio link measurement window for a serving cell to which the UE belongs.

In still yet another aspect, the present disclosure provides in some embodiments a method for transmitting SI for use in a UE, including: receiving a DRS from a base station, a configuration parameter of an SI window corresponding to each piece of SI being carried in an eSIB in the DRS; determining a position of each SI window in accordance with the configuration parameter of the SI window; and receiving the SI from the base station through each SI window, each SI window corresponding to one piece of SI, and parts of the SI windows being configured in a radio link measurement window for a serving cell to which the UE belongs.

In still yet another aspect, the present disclosure provides in some embodiments a device for transmitting SI for use in a UE, including: a first reception module configured to receive a DRS from a base station, a configuration parameter of an SI window corresponding to each piece of SI being carried in an eSIB in the DRS; a second processing module configured to determine a position of each SI window in accordance with the configuration parameter of the SI window; and a second reception module configured to receive the SI from the base station through each SI window, each SI window corresponding to one piece of SI, and parts of the SI windows being configured in a radio link measurement window for a serving cell to which the UE belongs.

In still yet another aspect, the present disclosure provides in some embodiments a UE, including: a receiver configured to receive a DRS from a base station, a configuration parameter of an SI window corresponding to each piece of SI being carried in an eSIB in the DRS; and a processor connected to the receiver and configured to determine a position of each SI window in accordance with the configuration parameter of the SI window. The receiver is further configured to receive the SI from the base station through each SI window, each SI window corresponds to one piece of SI, and parts of the SI windows are configured in a radio link measurement window for a serving cell to which the UE belongs.

According to the embodiments of the present disclosure, parts of the SI windows corresponding to the pieces of SI are configured in the radio link measurement window for the serving cell to which the UE belongs, so the UE may try to receive the SI while performing the radio link measurement. As a result, it is able to reduce the power consumption of the UE when it is necessary for the UE to enable the receiver beyond the radio link measurement window, thereby to prolong a service life of a battery of the UE.

DETAILED DESCRIPTION OF THE EMBODIMENTS

The present disclosure will be described hereinafter in conjunction with the drawings and embodiments. The following embodiments are for illustrative purposes only, but shall not be used to limit the scope of the present disclosure. In contrary, these embodiments are used for understand the present disclosure thoroughly and provide the complete scope of the present disclosure to a person skilled in the art.

In the related art, when a configuration of SI is applied to a radio communication system where a CRS is transmitted intermittently, it is necessary for a UE to enable a receiver beyond a radio link measurement window, and thereby the power consumption of the UE may increase. In the embodiments of the present disclosure, parts of SI windows are configured in a radio link measurement window, so the UE may try to receive the SI while performing the radio link measurement. As a result, it is able to reduce the power consumption of the UE, thereby to prolong a service life of a battery of the UE.

First Embodiment

Figure 1:
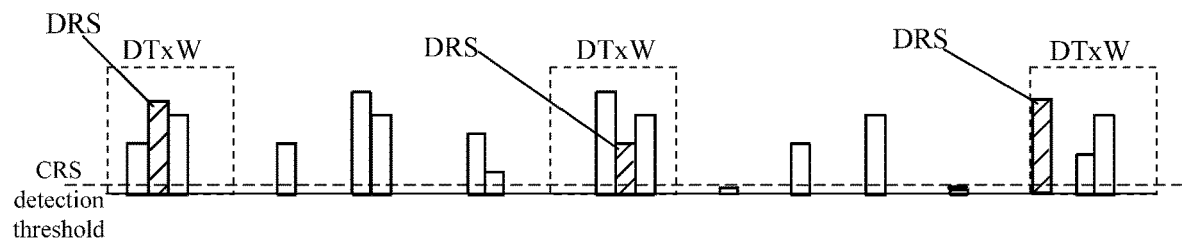
FIG. 1 is a schematic view showing the detection of a CRS by a UE in an MF system.
Figure 2:
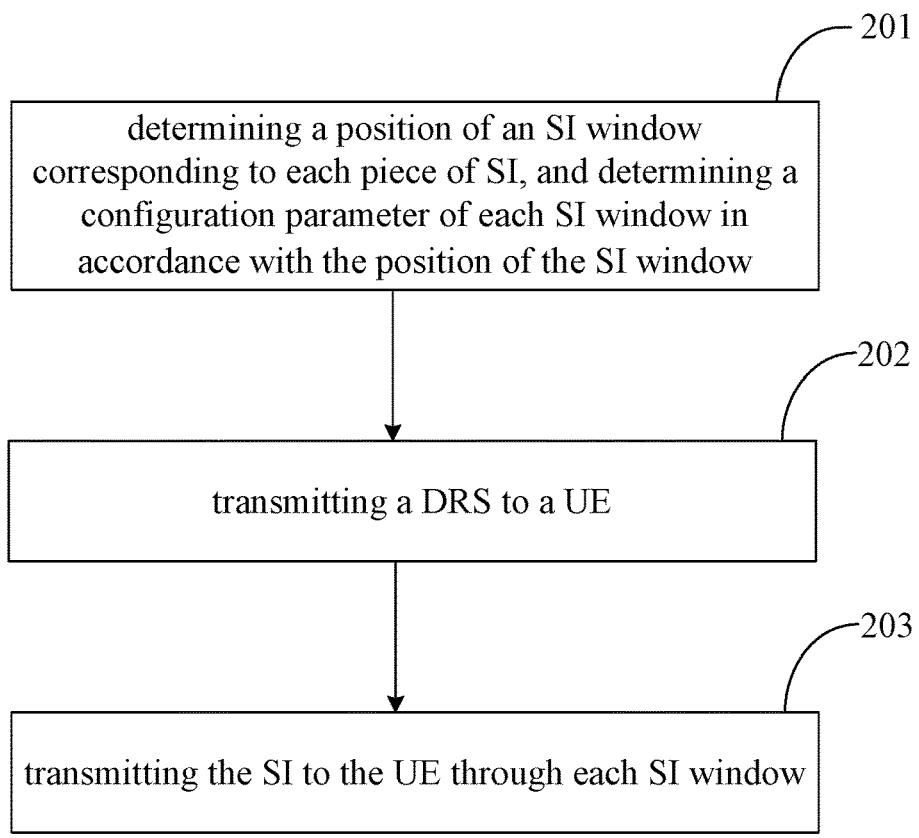
FIG. 2 is a flow chart of a method for transmitting SI according to a first embodiment of the present disclosure.

The present disclosure provides in this embodiment a method for transmitting SI for use in a base station which, as shown in FIG. 2, includes: Step 201 of determining a position of an SI window corresponding to each piece of SI, and determining a configuration parameter of each SI window in accordance with the position of the SI window; Step 202 of transmitting a DRS to a UE, the configuration parameter of each SI window being carried in an eSIB in the DRS; and Step 203 of transmitting the SI to the UE through each SI window. Each SI window corresponds to one piece of SI, and parts of the SI windows are configured in a radio link measurement window for a serving cell to which the UE belongs.

In the first embodiment of the present disclosure, for a radio communication system which transmits a DRC intermittently (e.g., an MF system), the UE merely performs the radio link measurement within a designated time window. Hence, the base station may determine the position of each SI window through acquiring a configuration parameter of the radio link measurement window of the serving cell to which the UE belongs, so as to configure the SI window of the serving cell in the radio link measurement window of the serving cell. The radio link measurement window includes a DMTC window and a DTxW, so the SI window of the serving cell may be configured in the DMTC window or the DTxW. In other words, the radio link measurement window may be the DMTC window or the DTxW.

According to the first embodiment of the present disclosure, parts of the SI windows are configured in the DMTC window or the DTxW, so that the UE may try to receive the SI while performing the radio link measurement. As a result, it is able to reduce the power consumption of the UE when it is necessary for the UE to enable a receiver beyond the radio link measurement window, thereby to prolong a service life of a battery of the UE.

Second Embodiment

Figure 3:
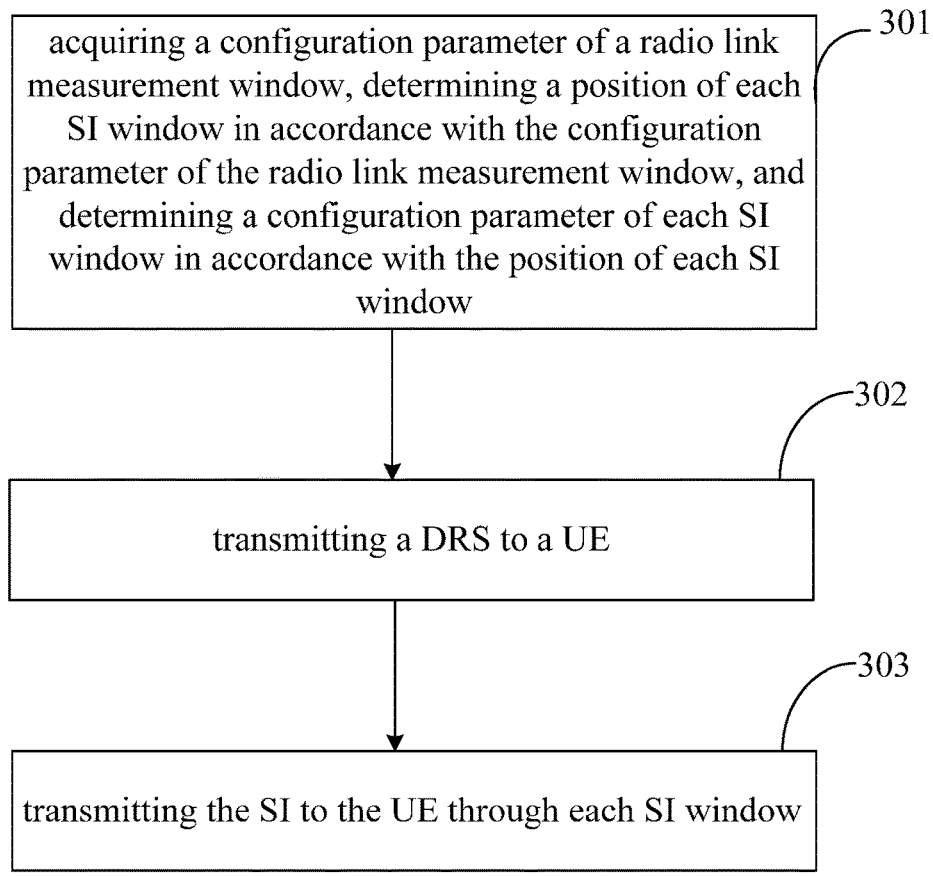
FIG. 3 is a flow chart of a method for transmitting SI according to a second embodiment of the present disclosure.

The present disclosure further provides in this embodiment a method for transmitting SI for use in a base station which, as shown in FIG. 3, includes the following steps.

Step 301: acquiring a configuration parameter of a radio link measurement window, determining a position of each SI window in accordance with the configuration parameter of the radio link measurement window, and determining a configuration parameter of each SI window in accordance with the position of each SI window.

In the second embodiment of the present disclosure, the configuration parameter of the radio link measurement window includes a period of the radio link measurement window, a subframe offset of the radio link measurement window within the period, and a duration of the radio link measurement window. It should be appreciated that, the radio link measurement window may be a DTxW, and corresponding, a configuration parameter of the DTxW may include a period of the DTxW, a subframe offset of the DTxW within the period, and a duration of the DTxW.

In addition, the configuration parameter of each SI window may include a period of the SI window, a basic subframe offset of the SI window within the period, and a length of the SI window.

Step 302: transmitting a DRS to a UE. The configuration parameter of each SI window is carried in an eSIB in the DRS.

It should be appreciated that, a start frame number of the DTxW mod T=0, a start subframe number of the DTxW is 0, and T=dtxw−Periodicity/10, where dtxw−Periodicity represents the period of the DTxW.

Step 303: transmitting the SI to the UE through the corresponding SI window. Each SI window corresponds to one piece of SI, and parts of the SI windows are configured in the radio link measurement window for a serving cell to which the UE belongs.

In the second embodiment of the present disclosure, Step 301 may include the following four implementation modes.

In a first implementation mode, first information indicating that the SI is not transmitted within a DRS subframe may be provided, and the eSIB and the SI may be transmitted separately. The first implementation mode may include the following steps.

In a first step, the period of each SI window may be set as an integral multiple of the period of the radio link measurement window (i.e., the DTxW). The periods of the SI windows may be different from each other, and they may be integral multiples of the period of the DTxW.

In a second step, a subframe offset of the radio link measurement window (i.e., the DTxW) within the period may serve as the basic subframe offset of each SI window within the period. The subframe offset of the DTxW within the period is 0, i.e., the basic subframe offset of each SI window within the period may be 0.

In a third step, a start frame number of each SI window may be calculated through the following formula: the start frame number of the SI window % T=FLOOR(x/10), where T=SI-Periodicity/10, SI-Periodicity represents the period of the of each SI window, and x represents the start subframe offset of the SI window within the period. To be specific, when it is necessary to calculate the start frame number of a certain SI window, the period of the SI window and the start subframe offset within the period may be substituted into the above formula.

In a fourth step, a start subframe number of each SI window may be calculated through the following formula: the start subframe number of the SI window=x % 10. To be specific, when it is necessary to calculate the start subframe number of a certain SI window, the start subframe offset of the SI window within the period may be substituted into the above formula.

In a fifth step, a length of each SI window may be calculated through the following formula: w=FLOOR (Duration/N1), where w represents the length of the SI window, Duration represents the duration of the radio link measurement window (i.e., the DTxW), and N1 represents the quantity of the SI windows in the radio link measurement window (i.e., the DTxW). To be specific, N1 may be the total quantity of the SI windows, or a value smaller than the total quantity of the SI windows. In other words, all or parts of the SI windows may be configured in the DTxW.

In a sixth step, the start subframe offset of each SI window within the period may be calculated through the following formula: x=Offset+(n−1)*w, where Offset represents the basic subframe offset of each SI window within the period, and n represents a serial number of each SI window in an SI list and n is greater than or equal to 1. To be specific, when it is necessary to calculate the start subframe offset of a certain SI window within the period, the basic subframe offset of the SI window within the period, the serial number of the SI window in the SI list, and the length of the SI window may be substituted into the above formula.

In the first implementation mode, the eSIB may further include the first information for indicating the UE that the SI is not transmitted within the DRS subframe, and the eSIB and the SI are transmitted separately. In addition, an order of the above steps will not be particularly defined herein.

It should be appreciated that, when merely parts of the SI windows are configured in the DTxW, the previous N1 SI windows are located in the DTxW, and the last N−N1 SI windows are located beyond the DTxW, where N represents the total quantity of the SI windows. At this time, when an SI window of a larger serial number has a larger period and a lower transmission frequency in an air interface, it is able to reduce the power consumption of the UE to the greatest extent through configuring the last N−N1 SI windows beyond the DTxW.

In addition, the base station may scramble Downlink Control Information (DCI) for scheduling the eSIB and the SI through a same RNTI, i.e., an SI-RNTI, and the UE may receive the eSIB and the SI through the SI-RNTI. The eSIB and the SI are transmitted separately, and the eSIB rather than the SI is transmitted within the DRS subframe, i.e., the SI is configured within a non-DRS subframe in the DTxW. Hence, when there is a subframe in the SI window where the DRS is to be transmitted, the SI is incapable of being transmitted within this subframe.

In the second embodiment of the present disclosure, the first implementation mode for determining the position and the configuration parameter of each SI window will be described hereinafter in the following two examples.

Figure 4:
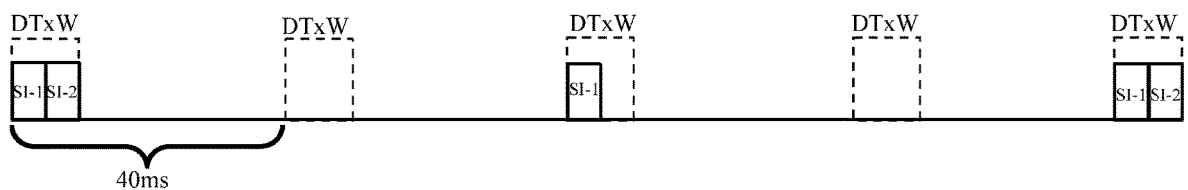
FIG. 4 is a schematic view showing the configuration of SI windows in a first implementation mode according to the second embodiment of the present disclosure.

In a first example, all the SI windows may be configured in the DTxW, as shown in FIG. 4. A period of the DTxW is 40 ms, a duration of the DTxW is 4 ms, a length of each SI window is 2 ms, and the quantity of the SI windows is 2, i.e., SI-1 with a period of 80 ms and SI-2 with a period of 160 ms. For a start subframe offset of the SI-1 within the period, x=0, a start position of the SI-1 meets the following condition: a start frame number of the SI-1%8=0, and a start subframe number of the SI-1 is 0. For a start subframe offset of the SI-2 within the period, x=2, a start position of the SI-2 meets the following condition: a start frame number of the SI-2%16=0, and a start subframe number of the SI-2 is 2.

Figure 5:
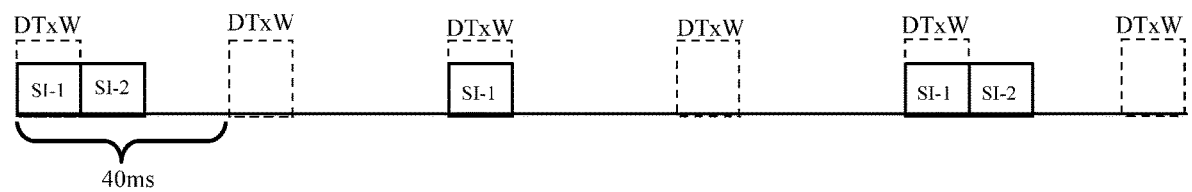
FIG. 5 is another schematic view showing the configuration of the SI windows in the first implementation mode according to the second embodiment of the present disclosure.

In a second example, parts of the SI windows may be configured in the DTxW, as shown in FIG. 5. The total quantity of the SI windows is 2, i.e., SI-1 and SI-2. The SI-1 may be configured in the DTxW, and the SI-2 may be configured beyond the DTxW. A period of the DTxW is 40 ms, a duration of the DTxW is 4 ms, a length of each SI window is 4 ms, a period of the SI-1 is 80 ms, and a period of the SI-2 is 160 ms. For a start subframe offset of the SI-1 within the period, x=0, a start position of the SI-1 meets the following condition: a start frame number of the SI-1%8=0, and a start subframe number of the SI-1 is 0. For a start subframe offset of the SI-2 within the period, x=4, a start position of the SI-2 meets the following condition: a start frame number of the SI-2%16=0, and a start subframe number of the SI-2 is 4.

In a second implementation mode, second information indicating that the eSIB and the SI are capable of being transmitted simultaneously within the DRS subframe may be provided, and the eSIB and the SI may be transmitted separately. The second implementation mode may include the following steps.

In a first step, the period of each SI window may be set as an integral multiple of the period of the radio link measurement window (i.e., the DTxW). The periods of the SI windows may be different from each other, and they may be integral multiples of the period of the DTxW.

In a second step, a subframe offset of the radio link measurement window (i.e., the DTxW) within the period may serve as the basic subframe offset of each SI window within the period. The subframe offset of the DTxW within the period is 0, i.e., the basic subframe offset of each SI window within the period may be 0.

In a third step, a start frame number of each SI window may be calculated through the following formula: the start frame number of the SI window % T=FLOOR(x/10), where T=SI-Periodicity/10, SI-Periodicity represents the period of the of each SI window, and x represents the start subframe offset of the SI window within the period. To be specific, when it is necessary to calculate the start frame number of a certain SI window, the period of the SI window and the start subframe offset within the period may be substituted into the above formula.

In a fourth step, a start subframe number of each SI window may be calculated through the following formula: the start subframe number of the SI window=x % 10. To be specific, when it is necessary to calculate the start subframe number of a certain SI window, the start subframe offset of the SI window within the period may be substituted into the above formula.

In a fifth step, a length of each SI window may be calculated through the following formula: w=FLOOR (Duration/N1), where w represents the length of the SI window, Duration represents the duration of the radio link measurement window (i.e., the DTxW), and N1 represents the quantity of the SI windows in the radio link measurement window (i.e., the DTxW). To be specific, N1 may be the total quantity of the SI windows, or a value smaller than the total quantity of the SI windows. In other words, all or parts of the SI windows may be configured in the DTxW.

In a sixth step, the start subframe offset of each SI window within the period may be calculated through the following formula: x=Offset+(n−1)*w, where Offset represents the basic subframe offset of each SI window within the period, and n represents a serial number of each SI window in an SI list and n is greater than or equal to 1. To be specific, when it is necessary to calculate the start subframe offset of a certain SI window within the period, the basic subframe offset of the SI window within the period, the serial number of the SI window in the SI list, and the length of the SI window may be substituted into the above formula.

In the second implementation mode, the eSIB may further include the second information for indicating that the UE is capable of transmitting the eSIB and the SI simultaneously within the DRS subframe, and the eSIB and the SI are transmitted separately. In other words, the eSIB and the SI are allowed to be transmitted simultaneously within the DRS subframe, and the SI may be transmitted within all the subframes in the DTxW. Hence, merely the eSIB may be transmitted within the DRS subframe, or both the eSIB and the corresponding SI may be transmitted simultaneously within the DRS subframe. The DRS may be transmitted within any subframe in the DTxW, so the eSIB may be transmitted simultaneously with the SI within any SI window in the DTxW. In addition, an order of the above steps will not be particularly defined herein.

It should be appreciated that, when the eSIB and one piece of SI are transmitted simultaneously within the DRS subframe, the base station may schedule the eSIB and the SI through different pieces of DCI, e.g., the pieces of DCI of different sizes or in different formats, or through the same DCI. In other words, the DCI corresponding to the eSIB may be the same as, or different from the DCI corresponding to the SI. When the eSIB and the SI are scheduled by the base station through different pieces of DCI, the pieces of DCI may be scrambled through different RNTIs, and the UE may detect the eSIB and the SI through the different RNTIs. In addition, the pieces of DCI may also be scrambled through the same RNTI, i.e., the SI-RNTI, and the UE may detect the eSIB and the SI through the SI-RNTI.

In a third implementation mode, the eSIB and a first piece of SI are transmitted within the DRS subframe. The third implementation mode may include the following steps.

In a first step, the period of each SI window may be set as an integral multiple of the period of the radio link measurement window (i.e., the DTxW). The periods of the SI windows may be different from each other, and they may be integral multiples of the period of the DTxW. It should be appreciated that, the SI windows involved in the first step refer to the SI windows other than an SI window corresponding to the first piece of SI.

In a second step, a subframe offset of the radio link measurement window (i.e., the DTxW) within the period may serve as the basic subframe offset of each SI window within the period. The subframe offset of the DTxW within the period is 0, i.e., the basic subframe offset of each SI window within the period may be 0.

In a third step, a start frame number of each SI window may be calculated through the following formula: the start frame number of the SI window % T=FLOOR(x/10), where T=SI-Periodicity/10, SI-Periodicity represents the period of the of each SI window, and x represents the start subframe offset of the SI window within the period. To be specific, when it is necessary to calculate the start frame number of a certain SI window, the period of the SI window and the start subframe offset within the period may be substituted into the above formula.

In a fourth step, a start subframe number of each SI window may be calculated through the following formula: the start subframe number of the SI window=x % 10. To be specific, when it is necessary to calculate the start subframe number of a certain SI window, the start subframe offset of the SI window within the period may be substituted into the above formula.

It should be appreciated that, in the above third and fourth steps, the start frame number and the start subframe number of the SI window other than that corresponding to the first piece of SI are calculated.

In a fifth step, a length of each SI window may be calculated through the following formula: w=FLOOR (Duration/(N1−1)), where w represents the length of the SI window, Duration represents the duration of the radio link measurement window (i.e., the DTxW), and N1 represents the quantity of the SI windows in the radio link measurement window (i.e., the DTxW).

In a sixth step, the start subframe offset of each SI window within the period may be calculated through the following formula: x=Offset+(n−2)*w, where x represents the start subframe offset of each SI window within the period, Offset represents the basic subframe offset of each SI window within the period, and n represents a serial number of each SI window in an SI list and n is greater than or equal to 2. To be specific, when it is necessary to calculate the start subframe offset of a certain SI window within the period, the basic subframe offset of the SI window within the period, the serial number of the SI window in the SI list, and the length of the SI window may be substituted into the above formula.

In the implementation mode, the eSIB may further include third information for indicating the UE to transmit the eSIB and the first piece of SI simultaneously within the DRS subframe, and fourth information for indicating the UE that the SI other than that transmitted simultaneously with the eSIB is not transmitted within the DRS subframe. In other words, the eSIB and the first piece of SI are allowed to be transmitted simultaneously within the DRS subframe. A period of the SI window corresponding to the first piece of SI is an integral multiple of a period of the eSIB, and the first piece of SI is configured fixedly, i.e., the first piece of SI is configured to be transmitted simultaneously with the eSIB. In addition, an order of the above steps will not be particularly defined herein.

It should be appreciated that, when merely parts of the SI windows are configured in the DTxW, the previous N1 SI windows are located in the DTxW, and the last N−N1 SI windows are located beyond the DTxW, where N represents the total quantity of the SI windows. At this time, when an SI window of a larger serial number has a larger period and a lower transmission frequency in an air interface, it is able to reduce the power consumption of the UE to the greatest extent through configuring the last N−N1 SI windows beyond the DTxW.

In addition, in the third implementation mode, the SI transmitted simultaneously with the eSIB may also be the SI other than the first piece of SI. It should be further appreciated that, when the eSIB and the SI are transmitted simultaneously within the DRS subframe, the base station may schedule the eSIB and the SI through different pieces of DCI, e.g., the pieces of DCI of different sizes or in different formats, or through the same DCI. In other words, the DCI corresponding to the eSIB may be the same as, or different from, the DCI corresponding to the SI. When the eSIB and the SI are scheduled by the base station through different pieces of DCI, the pieces of DCI may be scrambled through different RNTIs, and the UE may detect the eSIB and the SI through the different RNTIs. In addition, the pieces of DCI may also be scrambled through the same RNTI, i.e., the SI-RNTI, and the UE may detect the eSIB and the SI through the SI-RNTI.

In a fourth implementation mode, all the SI windows are configured within K radio link measurement windows. The configuration parameter of each SI window further includes a period of each radio link measurement window and the quantity of the SI windows configured in each of the K radio link measurement windows. The fourth implementation mode may include the following steps.

In a first step, the period of each SI window may be set as an integral multiple of the period of each radio link measurement window (i.e., the DTxW), and the period of each SI window may be greater than or equal to K times of the period of each radio link measurement window. The periods of the SI windows may be different from each other, and they may be integral multiples of the period of the DTxW.

In a second step, a subframe offset of each radio link measurement window (i.e., the DTxW) within the period may serve as the basic subframe offset of each SI window within the period. The subframe offset of the DTxW within the period is 0, i.e., the basic subframe offset of each SI window within the period may be 0.

In a third step, a start frame number of each SI window may be calculated through the following formula: the start frame number of the SI window % T=FLOOR(x/10), where T=SI-Periodicity/10, SI-Periodicity represents the period of the of each SI window, and x represents the start subframe offset of the SI window within the period. To be specific, when it is necessary to calculate the start frame number of a certain SI window, the period of the SI window and the start subframe offset within the period may be substituted into the above formula.

In a fourth step, a start subframe number of each SI window may be calculated through the following formula: the start subframe number of the SI window=x % 10. To be specific, when it is necessary to calculate the start subframe number of a certain SI window, the start subframe offset of the SI window within the period may be substituted into the above formula.

In a fifth step, a length of each SI window may be calculated through the following formula: w=FLOOR (Duration/N2), where w represents the length of the SI window, Duration represents the duration of each radio link measurement window (i.e., the DTxW), and N2 represents the quantity of the SI windows configured in each of the K radio link measurement windows (i.e., the DTxWs).

In the fourth implementation mode, the start subframe offset of each SI window within the period may be calculated in two ways, i.e., the following sixth step and seventh step. In other words, the sixth step and the seventh step are parallel to each other, and any one of them may be selected.

In the sixth step, the start subframe offset of each SI window within the period may be calculated through the following formula: x=Offset+(k−1)*Periodicity+(m−1)*w, where x represents the start subframe offset of each SI window within the period, k=FLOOR((n−1)/N2)+1, m=n % N, n represents a serial number of each SI window in an SI list and n is greater than or equal to 1, N2 represents the quantity of the SI windows configured in each of the K radio link measurement windows (i.e., DTxWs), m represents a serial number of each SI window in a $k^{th}$ radio link measurement window (i.e., the DTxW), Periodicity represents the period of each radio link measurement window (i.e., the DTxW), and Offset represents the basic subframe offset of each SI window within the period.

In the seventh step, a virtual start subframe offset of each SI window within the SI period may be calculated through the formula x'=(n−1)*w, and then a start subframe offset of each SI window may be calculated through the formula x=Offset+x'+FLOOR((n−1)/N2)*(Periodicity−N2*w), where x' represents the virtual start subframe offset of each SI window within the SI period, n represents a serial number of the SI window in the SI list and n is greater than or equal to 1, x represents the start subframe offset of the SI window, N2 represents the quantity of the SI windows configured in each of the K radio link measurement windows, Offset represents the basic subframe offset of the SI window within the period, and Periodicity represents the period of each radio link measurement window.

In the fourth implementation mode, the eSIB may further include fifth information for indicating the UE that all the SI windows are configured in the K radio link measurement windows. An order of the above steps will not be particularly defined herein. In addition, this implementation mode supports discontinuous configuration of the SI windows, i.e., there may exist a gap between the two adjacent SI windows.

In the second embodiment of the present disclosure, the fourth implementation mode for determining the position and the configuration parameter of each SI window will be described hereinafter through the following example.

Figure 6:
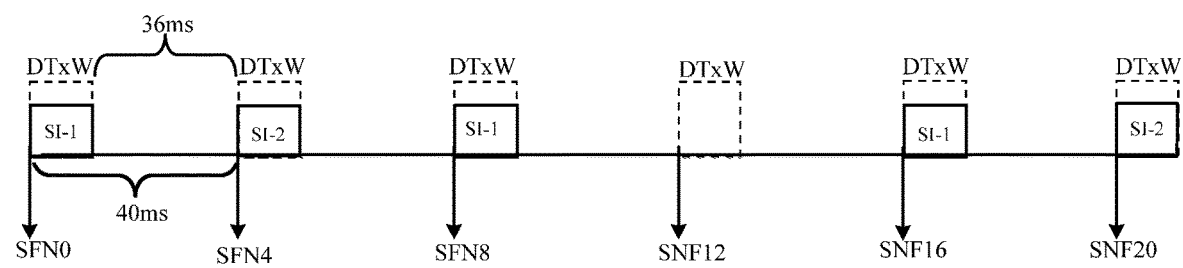
FIG. 6 is a schematic view showing the configuration of the SI windows in a fourth implementation mode according to the second embodiment of the present disclosure.

In the example, all the SI windows are configured discontinuously, and there are two SI windows, i.e., SI-1 and SI-2, as shown in FIG. 6. The SI-1 is configured in a first DTxW, and the SI-2 is configured in a second DTxW. A period of each DTxW is 40 ms, a duration of each DTxW is 4 ms, a length of each SI window is 4 ms, a period of the SI-1 is 80 ms, and a period of the SI-2 is 160 ms. For a start subframe offset of the SI-1 within the period, x=0, and a start position meets the condition: a start frame number of the SI-1%8=0, and a start subframe number of the SI-1 is 0. For a start subframe offset of the SI-2 within the period, x=40, and a start position meets the condition: a start frame number of the SI-2%16=4, and a start subframe number of the SI-2 is 0. The start subframe offset of the SI-1 within the period and the start subframe offset of the SI-2 within the period may be calculated through the formula in the above seventh step.

Third Embodiment

Figure 7:
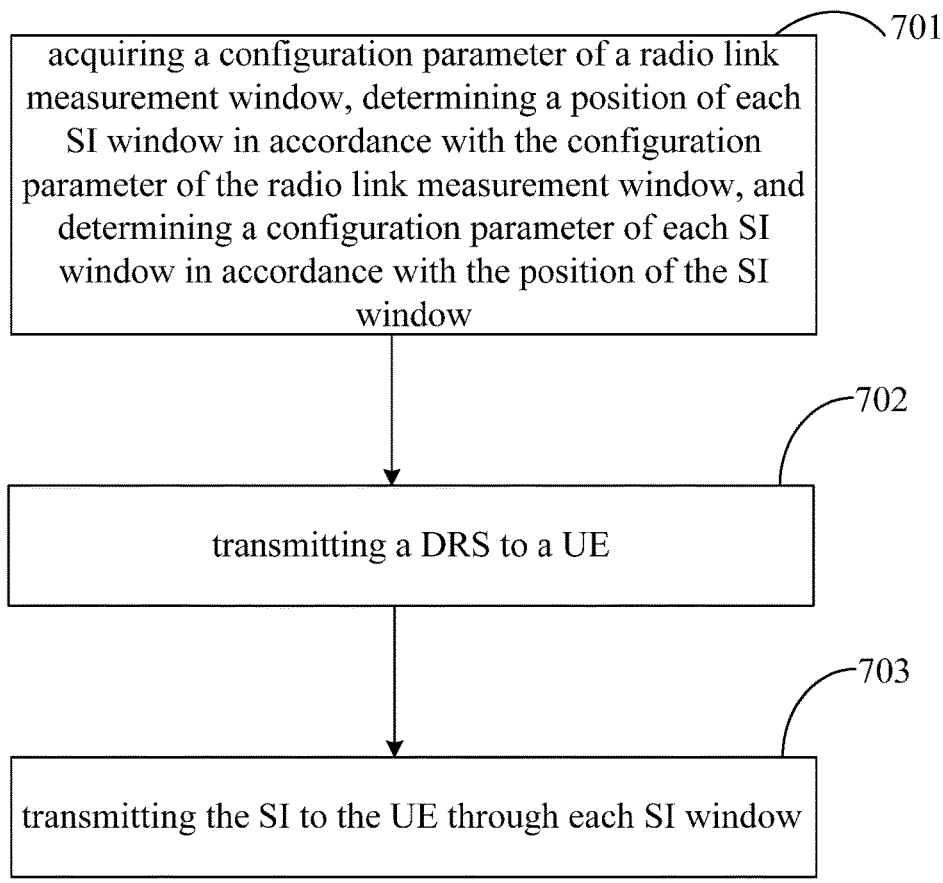
FIG. 7 is a flow chart of a method for transmitting SI according to a third embodiment of the present disclosure.

The present disclosure further provides in this embodiment a method for transmitting system information for use in a base station which, as shown in FIG. 7, includes the following steps.

Step 701: acquiring a configuration parameter of a radio link measurement window, determining a position of each SI window in accordance with the configuration parameter of the radio link measurement window, and determining a configuration parameter of each SI window in accordance with the position of the SI window.

In the third embodiment of the present disclosure, the configuration parameter of the radio link measurement window includes a period of the radio link measurement window, a subframe offset of the radio link measurement window within the period, and a duration of the radio link measurement window. It should be appreciated that, in the third embodiment of the present disclosure, the radio link measurement window is a DMTC window, and correspondingly, a configuration parameter of the DMTC window includes a period of the DMTC window, a subframe offset of the DMTC window within the period, and a duration of the DMTC window.

In addition, the configuration parameter of each SI window includes a period of the SI window, a basic subframe offset of the SI window within the period and a length of the SI window.

Step 702: transmitting a DRS to a UE. The configuration parameter of each SI window is carried in an eSIB in the DRS.

It should be appreciated that, a start frame number of the DMTC window mod T=FLOOR(dmtc−Offset/10), a start subframe number of the DTMC window=dmtc−Offset mod 10, where T=dmtc−Periodicity/10, dmtc−Offset represents the subframe offset of the DMTC window within the period, and dmtc−Periodicity represents the period of the DMTC window.

Step 703: transmitting the SI to the UE through each SI window. Each SI window corresponds to one piece of SI, and parts of the SI windows are configured in a radio link measurement window for a serving cell to which the UE belongs.

In the third embodiment of the present disclosure, Step 701 may include the following four implementation modes.

In a first implementation mode, first information indicating that the SI is not transmitted within a DRS subframe may be provided, and the eSIB and the SI may be transmitted separately. The first implementation mode may include the following steps.

In a first step, the period of each SI window may be set as an integral multiple of the period of the radio link measurement window (i.e., the DMTC window). The periods of the SI windows may be different from each other, and they may be integral multiples of the period of the DMTC window.

In a second step, a subframe offset of the radio link measurement window (i.e., the DMTC window) within the period may serve as the basic subframe offset of each SI window within the period.

In a third step, a start frame number of each SI window may be calculated through the following formula: the start frame number of the SI window % T=FLOOR(x/10), where T=SI−Periodicity/10, SI−Periodicity represents the period of the of each SI window, and x represents the start subframe offset of the SI window within the period. To be specific, when it is necessary to calculate the start frame number of a certain SI window, the period of the SI window and the start subframe offset within the period may be substituted into the above formula.

In a fourth step, a start subframe number of each SI window may be calculated through the following formula: the start subframe number of the SI window=x % 10. To be specific, when it is necessary to calculate the start subframe number of a certain SI window, the start subframe offset of the SI window within the period may be substituted into the above formula.

In a fifth step, a length of each SI window may be calculated through the following formula: w=FLOOR (Duration/N1), where w represents the length of the SI window, Duration represents the duration of the radio link measurement window (i.e., the DMTC window), and N1 represents the quantity of the SI windows in the radio link measurement window (i.e., the DMTC window). To be specific, N1 may be the total quantity of the SI windows, or a value smaller than the total quantity of the SI windows. In other words, all or parts of the SI windows may be configured in the DMTC window.

In a sixth step, the start subframe offset of each SI window within the period may be calculated through the following formula: x=Offset+(n−1)*w, where Offset represents the basic subframe offset of each SI window within the period, and n represents a serial number of each SI window in an SI list and n is greater than or equal to 1. To be specific, when it is necessary to calculate the start subframe offset of a certain SI window within the period, the basic subframe offset of the SI window within the period, the serial number of the SI window in the SI list, and the length of the SI window may be substituted into the above formula.

In the first implementation mode, the eSIB may further include the first information for indicating the UE that the SI is not transmitted within the DRS subframe, and the eSIB and the SI are transmitted separately. In addition, an order of the above steps will not be particularly defined herein.

It should be appreciated that, when merely parts of the SI windows are configured in the DTxW, the previous N1 SI windows are located in the DMTC window, and the last N−N1 SI windows are located beyond the DMTC window, where N represents the total quantity of the SI windows. At this time, when an SI window of a larger serial number has a larger period and a lower transmission frequency in an air interface, it is able to reduce the power consumption of the UE to the greatest extent through configuring the last N−N1 SI windows beyond the DMTC window.

In addition, the base station may scramble DCI for scheduling the eSIB and the SI through a same RNTI, i.e., an SI-RNTI, and the UE may receive the eSIB and the SI through the SI-RNTI. The eSIB and the SI are transmitted separately, and the eSIB rather than the SI is transmitted within the DRS subframe, i.e., the SI is configured within a non-DRS subframe in the DMTC window. Hence, when there is a subframe in the SI window where the DRS is to be transmitted, the SI is incapable of being transmitted within this subframe.

In a second implementation mode, second information indicating that the eSIB and the SI are capable of being transmitted simultaneously within the DRS subframe may be provided, and the eSIB and the SI may be transmitted separately. The second implementation mode may include the following steps.

In a first step, the period of each SI window may be set as an integral multiple of the period of the radio link measurement window (i.e., the DMTC window). The periods of the SI windows may be different from each other, and they may be integral multiples of the period of the DMTC window.

In a second step, a subframe offset of the radio link measurement window (i.e., the DMTC window) within the period may serve as the basic subframe offset of each SI window within the period.

In a third step, a start frame number of each SI window may be calculated through the following formula: the start frame number of the SI window % T=FLOOR(x/10), where T=SI−Periodicity/10, SI−Periodicity represents the period of the of each SI window, and x represents the start subframe offset of the SI window within the period. To be specific, when it is necessary to calculate the start frame number of a certain SI window, the period of the SI window and the start subframe offset within the period may be substituted into the above formula.

In a fourth step, a start subframe number of each SI window may be calculated through the following formula: the start subframe number of the SI window=x % 10. To be specific, when it is necessary to calculate the start subframe number of a certain SI window, the start subframe offset of the SI window within the period may be substituted into the above formula.

In a fifth step, a length of each SI window may be calculated through the following formula: w=FLOOR (Duration/N1), where w represents the length of the SI window, Duration represents the duration of the radio link measurement window (i.e., the DMTC window), and N1 represents the quantity of the SI windows in the radio link measurement window (i.e., the DMTC window). To be specific, N1 may be the total quantity of the SI windows, or a value smaller than the total quantity of the SI windows. In other words, all or parts of the SI windows may be configured in the DMTC window.

In a sixth step, the start subframe offset of each SI window within the period may be calculated through the following formula: x=Offset+(n−1)*w, where Offset represents the basic subframe offset of each SI window within the period, and n represents a serial number of each SI window in an SI list and n is greater than or equal to 1. To be specific, when it is necessary to calculate the start subframe offset of a certain SI window within the period, the basic subframe offset of the SI window within the period, the serial number of the SI window in the SI list, and the length of the SI window may be substituted into the above formula.

In the second implementation mode, the eSIB may further include the second information for indicating that the UE is capable of transmitting the eSIB and the SI simultaneously within the DRS subframe, and the eSIB and the SI are transmitted separately. In other words, the eSIB and the SI are allowed to be transmitted simultaneously within the DRS subframe, and the SI may be transmitted within all the subframes in the DMTC window. Hence, merely the eSIB may be transmitted within the DRS subframe, or both the eSIB and the corresponding SI may be transmitted simultaneously within the DRS subframe. The DRS may be transmitted within any subframe in the DMTC window, so the eSIB may be transmitted simultaneously with the SI within any SI window in the DMTC window. In addition, an order of the above steps will not be particularly defined herein.

It should be appreciated that, when the eSIB and one piece of SI are transmitted simultaneously within the DRS subframe, the base station may schedule the eSIB and the SI through different pieces of DCI, e.g., the pieces of DCI of different sizes or in different formats, or through the same DCI. In other words, the DCI corresponding to the eSIB may be the same as, or different from the DCI corresponding to the SI. When the eSIB and the SI are scheduled by the base station through different pieces of DCI, the pieces of DCI may be scrambled through different RNTIs, and the UE may detect the eSIB and the SI through the different RNTIs. In addition, the pieces of DCI may also be scrambled through the same RNTI, i.e., the SI-RNTI, and the UE may detect the eSIB and the SI through the SI-RNTI.

In a third implementation mode, the eSIB and a first piece of SI are transmitted within the DRS subframe. The third implementation mode may include the following steps.

In a first step, the period of each SI window may be set as an integral multiple of the period of the radio link measurement window (i.e., the DMTC window). The periods of the SI windows may be different from each other, and they may be integral multiples of the period of the DMTC window. It should be appreciated that, the SI windows involved in the first step refer to the SI windows other than an SI window corresponding to the first piece of SI.

In a second step, a subframe offset of the radio link measurement window (i.e., the DMTC window) within the period may serve as the basic subframe offset of each SI window within the period.

In a third step, a start frame number of each SI window may be calculated through the following formula: the start frame number of the SI window % T=FLOOR(x/10), where T=SI−Periodicity/10, SI−Periodicity represents the period of each SI window, and x represents the start subframe offset of the SI window within the period. To be specific, when it is necessary to calculate the start frame number of a certain SI window, the period of the SI window and the start subframe offset within the period may be substituted into the above formula.

In a fourth step, a start subframe number of each SI window may be calculated through the following formula: the start subframe number of the SI window=x % 10. To be specific, when it is necessary to calculate the start subframe number of a certain SI window, the start subframe offset of the SI window within the period may be substituted into the above formula.

It should be appreciated that, in the above third and fourth steps, the start frame number and the start subframe number of the SI window other than that corresponding to the first piece of SI are calculated.

In a fifth step, a length of each SI window may be calculated through the following formula: w=FLOOR (Duration/(N1−1)), where w represents the length of the SI window, Duration represents the duration of the radio link measurement window (i.e., the DMTC window), and N1 represents the quantity of the SI windows in the radio link measurement window (i.e., the DMTC window).

In a sixth step, the start subframe offset of each SI window within the period may be calculated through the following formula: x=Offset+(n−2)*w, where x represents the start subframe offset of each SI window within the period, Offset represents the basic subframe offset of each SI window within the period, and n represents a serial number of each SI window in an SI list and n is greater than or equal to 2. To be specific, when it is necessary to calculate the start subframe offset of a certain SI window within the period, the basic subframe offset of the SI window within the period, the serial number of the SI window in the SI list, and the length of the SI window may be substituted into the above formula.

In the implementation mode, the eSIB may further include third information for indicating the UE to transmit the eSIB and the first piece of SI simultaneously within the DRS subframe, and fourth information for indicating the UE that the SI other than that transmitted simultaneously with the eSIB is not transmitted within the DRS subframe. In other words, the eSIB and the first piece of SI are allowed to be transmitted simultaneously within the DRS subframe. A period of the SI window corresponding to the first piece of SI is an integral multiple of a period of the eSIB, and the first piece of SI is configured fixedly, i.e., the first piece of SI is configured to be transmitted simultaneously with the eSIB. In addition, an order of the above steps will not be particularly defined herein.

It should be appreciated that, when merely parts of the SI windows are configured in the DMTC window, the previous N1 SI windows are located in the DMTC window, and the last N−N1 SI windows are located beyond the DMTC window, where N represents the total quantity of the SI windows. At this time, when an SI window of a larger serial number has a larger period and a lower transmission frequency in an air interface, it is able to reduce the power consumption of the UE to the greatest extent through configuring the last N−N1 SI windows beyond the DMTC window.

In addition, in the third implementation mode, the SI transmitted simultaneously with the eSIB may also be the SI other than the first piece of SI. It should be further appreciated that, when the eSIB and the SI are transmitted simultaneously within the DRS subframe, the base station may schedule the eSIB and the SI through different pieces of DCI, e.g., the pieces of DCI of different sizes or in different formats, or through the same DCI. In other words, the DCI corresponding to the eSIB may be the same as, or different from, the DCI corresponding to the SI. When the eSIB and the SI are scheduled by the base station through different pieces of DCI, the pieces of DCI may be scrambled through different RNTIs, and the UE may detect the eSIB and the SI through the different RNTIs. In addition, the pieces of DCI may also be scrambled through the same RNTI, i.e., the SI-RNTI, and the UE may detect the eSIB and the SI through the SI-RNTI.

In a fourth implementation mode, all the SI windows are configured within K radio link measurement windows. The configuration parameter of each SI window further includes a period of each radio link measurement window and the quantity of the SI windows configured in each of the K radio link measurement windows. The fourth implementation mode may include the following steps.

In a first step, the period of each SI window may be set as an integral multiple of the period of each radio link measurement window (i.e., the DMTC window), and the period of each SI window may be greater than or equal to K times of the period of each radio link measurement window. The periods of the SI windows may be different from each other, and they may be integral multiples of the period of the DMTC window.

In a second step, a subframe offset of each radio link measurement window (i.e., the DMTC window) within the period may serve as the basic subframe offset of each SI window within the period.

In a third step, a start frame number of each SI window may be calculated through the following formula: the start frame number of the SI window % T=FLOOR(x/10), where T=SI-Periodicity/10, SI-Periodicity represents the period of the of each SI window, and x represents the start subframe offset of the SI window within the period. To be specific, when it is necessary to calculate the start frame number of a certain SI window, the period of the SI window and the start subframe offset within the period may be substituted into the above formula.

In a fourth step, a start subframe number of each SI window may be calculated through the following formula: the start subframe number of the SI window=x % 10. To be specific, when it is necessary to calculate the start subframe number of a certain SI window, the start subframe offset of the SI window within the period may be substituted into the above formula.

In a fifth step, a length of each SI window may be calculated through the following formula: w=FLOOR (Duration/N2), where w represents the length of the SI window, Duration represents the duration of each radio link measurement window (i.e., the DMTC window), and N2 represents the quantity of the SI windows configured in each of the K radio link measurement windows (i.e., the DMTC windows).

In the fourth implementation mode, the start subframe offset of each SI window within the period may be calculated in two ways, i.e., the following sixth step and seventh step. In other words, the sixth step and the seventh step are parallel to each other, and any one of them may be selected.

In the sixth step, the start subframe offset of each SI window within the period may be calculated through the following formula: x=Offset+(k−1)*Periodicity+(m−1)*w, where x represents the start subframe offset of each SI window within the period, k=FLOOR((n−1)/N2)+1, m=n % N, n represents a serial number of each SI window in an SI list and n is greater than or equal to 1, N2 represents the quantity of the SI windows configured in each of the K radio link measurement windows (i.e., the DMTC windows), m represents a serial number of each SI window in a $k^{th}$ radio link measurement window (i.e., the DMTC window), Periodicity represents the period of each radio link measurement window (i.e., the DMTC window), and Offset represents the basic subframe offset of each SI window within the period.

In the seventh step, a virtual start subframe offset of each SI window within the SI period may be calculated through the formula x'=(n−1)*w, and then a start subframe offset of each SI window may be calculated through the formula x=Offset+x'+FLOOR((n−1)/N2)*(Periodicity−N2*w), where x' represents the virtual start subframe offset of each SI window within the SI period, n represents a serial number of the SI window in the SI list and n is greater than or equal to 1, x represents the start subframe offset of the SI window, N2 represents the quantity of the SI windows configured in each of the K radio link measurement windows, Offset represents the basic subframe offset of the SI window within the period, and Periodicity represents the period of each radio link measurement window.

In the fourth implementation mode, the eSIB may further include fifth information for indicating the UE that all the SI windows are configured in the K radio link measurement windows. An order of the above steps will not be particularly defined herein. In addition, this implementation mode supports discontinuous configuration of the SI windows, i.e., there may exist a gap between the two adjacent SI windows.

In the third embodiment of the present disclosure, the fourth implementation mode for determining the position and the configuration parameter of each SI window will be described hereinafter through the following example.

Figure 8:
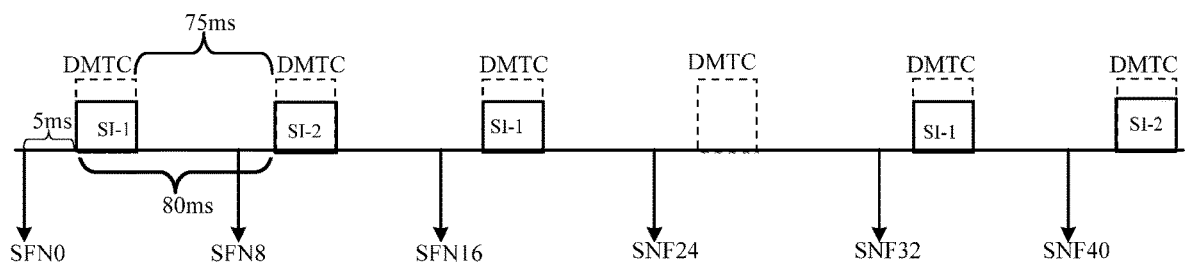
FIG. 8 is a schematic view showing the configuration the SI windows in a fourth implementation mode according to the third embodiment of the present disclosure.

In the example, all the SI windows are configured discontinuously, and there are two SI windows, i.e., SI-1 and SI-2, as shown in FIG. 8. The SI-1 is configured in a first DMTC window, and the SI-2 is configured in a second DMTC window. A period of each DMTC window is 80 ms, a duration of each DMTC window is 4 ms, a subframe offset of each DMTC window within the period is 5 ms, a length of each SI window is 4 ms, a period of the SI-1 is 160 ms, and a period of the SI-2 is 320 ms. For a start subframe offset of the SI-1 within the period, x=5, and a start position meets the condition: a start frame number of the SI-1% 16=0, and a start subframe number of the SI-1 is 5. For a start subframe offset of the SI-2 within the period, x=85, and a start position meets the condition: a start frame number of the SI-2%32=$^8$, and a start subframe number of the SI-2 is 5. The start subframe offset of the SI-1 within the period and the start subframe offset of the SI-2 within the period may be calculated through the formula in the above seventh step.

Fourth Embodiment

Figure 9:
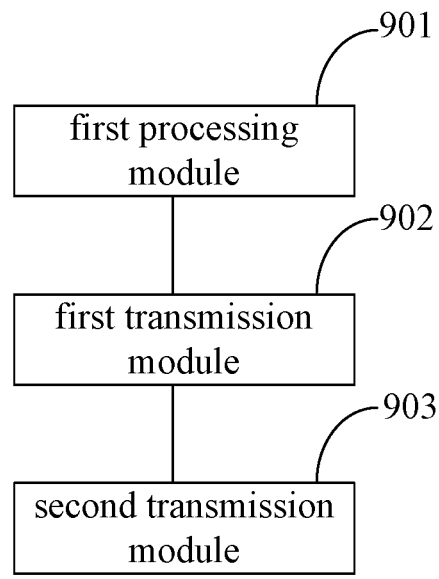
FIG. 9 is a schematic view showing a device for transmitting SI according to a fourth embodiment of the present disclosure.

The present disclosure provides in this embodiment a device for transmitting SI for use in a base station which, as shown in FIG. 9, includes: a first processing module 901 configured to determine a position of an SI window corresponding to each piece of SI, and determine a configuration parameter of each SI window in accordance with the position of the SI window; a first transmission module 902 configured to transmit a DRS to a UE, the configuration parameter of each SI window being carried in an eSIB in the DRS; and a second transmission module 903 configured to transmit the SI to the UE through each SI window, each SI window corresponding to one piece of SI, and parts of the SI windows being configured in a radio link measurement window for a serving cell to which the UE belongs.

In a possible embodiment of the present disclosure, the first processing module 901 includes an acquisition unit configured to acquire a configuration parameter of the radio link measurement window, and determine the position of each SI window in accordance with the configuration parameter of the radio link measurement window. The configuration parameter of the radio link measurement window includes a period of the radio link measurement window, a subframe offset of the radio link measurement window within the period, and a duration of the radio link measurement window.

In a possible embodiment of the present disclosure, the configuration parameter of each SI window includes a period of the SI window, a basic subframe offset of the SI window within the period, and a length of the SI window. The first processing module 901 includes: a first setting unit configured to set the period of each SI window as an integral multiple of the period of the radio link measurement window; a second setting unit configured to set the subframe offset of the radio link measurement window within the period as the basic subframe offset of the SI window within the period; a first calculation unit configured to calculate a start frame number of each SI window through the formula the start frame number of the SI window % T=FLOOR(x/10), where T=SI-Periodicity/10, SI-Periodicity represents the period of the SI window, and x represents the start subframe offset of the SI window within the period; and a second calculation unit configured to calculate a start subframe number of each SI window through the formula the start subframe number of the SI window=x % 10.

In a possible embodiment of the present disclosure, an eSIB further includes first information for indicating the UE that the SI is not transmitted within a DRS subframe, or second information for indicating the UE that both the eSIB and the SI are capable of being transmitted simultaneously within the DRS subframe. The first processing module 901 further includes: a third calculation unit configured to calculate the length of each SI window through the formula w=FLOOR (Duration/N1), where w represents the length of the SI window, Duration represents the duration of the radio link measurement window, and N1 represents the quantity of the SI windows configured in the radio link measurement window; and a fourth calculation unit configured to calculate the start subframe offset of each SI window through the formula x=Offset+(n−1)*w, where Offset represents the basic subframe offset of the SI window within the period, and n represents a serial number of the SI window in an SI list and n is greater than or equal to 1.

In a possible embodiment of the present disclosure, the eSIB further includes third information for indicating the UE that both the eSIB and a first piece of SI are transmitted simultaneously within the DRS subframe, and fourth information for indicating the UE that the SI other than that transmitted simultaneously with the eSIB is not transmitted within the DRS subframe. The first processing module 901 further includes: a fifth calculation unit configured to calculate the length of each SI window through the formula w=FLOOR(Duration/(N1−1)), where w represents the length of the SI window, Duration represents the duration of the radio link measurement window, and N1 represents the quantity of the SI windows configured in the radio link measurement window; and a sixth calculation unit configured to calculate the start subframe offset of each SI window within the period through the formula x=Offset+(n−2)*w, where x represents the start subframe offset of the SI window within the period, Offset represents the basic subframe offset of the SI window within the period, and n represents a serial number of the SI window in the SI list and n is greater than or equal to 2.

In a possible embodiment of the present disclosure, when the eSIB and the SI are transmitted simultaneously within the DRS subframe, DCI corresponding to the eSIB may be the same as, or different from, DCI corresponding to the SI, and when the DCI corresponding to the eSIB is different from the DCI corresponding to the SI, the DCI corresponding to the eSIB is scrambled through a same RNTI as, or a RNTI different from, the DCI corresponding to the SI.

In a possible embodiment of the present disclosure, the eSIB further includes fifth information for indicating the UE that all the SI windows are configured in K radio link measurement windows. The configuration parameter of each SI window further includes a period of each radio link measurement window and the quantity of the SI windows configured in each of the K radio link measurement windows. The period of each SI window is greater than or equal to K times of the period of each radio link measurement window. The first processing module 901 further includes: a seventh calculation unit configured to calculate the length of each SI window through the formula w=FLOOR (Duration/N2), where w represents the length of the SI window, Duration represents the duration of each radio link measurement window, and N2 represents the quantity of the SI windows configured in each of the K radio link measurement windows, and an eighth calculation unit configured to calculate the start subframe offset of each SI window within the period through x=Offset+(k−1)*Periodicity+(m−1)*w, where x represents the start subframe offset of the SI window within the period, k=FLOOR((n−1)/N2)+1, m=n % N, n represents a serial number of each SI window in the SI list and n is greater than or equal to 1, N2 represents the quantity of the SI windows configured in each of the K radio link measurement windows, m represents a serial number of the SI window in a $k^{th}$ radio link measurement window, Periodicity represents the period of each radio link measurement window, and Offset represents the basic subframe offset of the SI window within the period; or a ninth calculation unit configured to calculate a virtual start subframe offset of each SI window within the period through the formula x'=(n−1)*w, where x' represents the virtual start subframe offset of the SI window within the period, and n represents a serial number of the SI window in the SI list and n is greater than or equal to 1, and a tenth calculation unit configured to calculate the start subframe offset of each SI window through the formula x=Offset+x'+FLOOR((n−1)/N2)*(Periodicity−N2*w), where x represents the start subframe offset of the SI window, N2 represents the quantity of the SI windows configured in each of the K radio link measurement windows, Offset represents the basic subframe offset of the SI window within the period, and Periodicity represents the period of each radio link measurement window.

In a possible embodiment of the present disclosure, the radio link measurement window is a DTxW or a DMTC window.

According to the fourth embodiment of the present disclosure, parts of the SI windows are configured in the DMTC window or the DTxW, so that the UE may try to receive the SI while performing the radio link measurement. As a result, it is able to reduce the power consumption of the UE when it is necessary for the UE to enable the receiver beyond the radio link measurement window, thereby to prolong a service life of a battery of the UE.

It should be appreciated that, the device in the fourth embodiment of the present disclosure may be adopted to perform the above-mentioned method for transmitting the SI for use in the base station, i.e., the implementation of the device may refer to that of the abovementioned method, with a same or similar beneficial effect.

Fifth Embodiment

Figure 10:
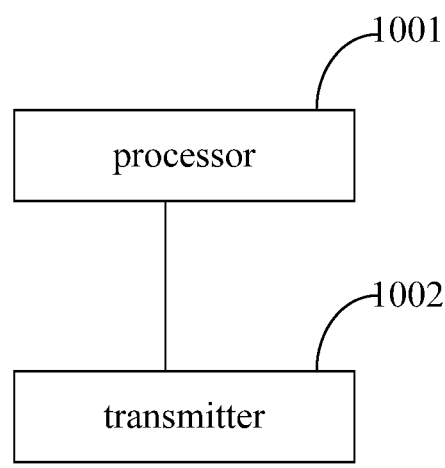
FIG. 10 is a schematic view showing a base station according to a fifth embodiment of the present disclosure.

The present disclosure further provides in this embodiment a base station which, as shown in FIG. 10, includes: a processor 1001 configured to determine a position of an SI window corresponding to each piece of SI, and determine a configuration parameter of each SI window in accordance with the position of the SI window; and a transmitter 1002 connected to the processor 1001 and configured to transmit a DRS to a UE, the configuration parameter of each SI window being carried in an eSIB in the DRS. The transmitter 1002 is further configured to transmit the SI to the UE through each SI window. Each SI window corresponds to one piece of SI, and parts of the SI windows are configured in a radio link measurement window for a serving cell to which the UE belongs.

According to the fifth embodiment of the present disclosure, parts of the SI windows are configured by the base station in the DMTC window or the DTxW, so that the UE may try to receive the SI while performing the radio link measurement. As a result, it is able to reduce the power consumption of the UE when it is necessary for the UE to enable the receiver beyond the radio link measurement window, thereby to prolong a service life of a battery of the UE.

It should be appreciated that, the base station may configure the pieces of SI within and beyond the radio link measurement window, the pieces of SI configured within and beyond the radio link measurement window may be separate from each other, and different criterions for calculating the SI windows may be provided. To be specific, the base station may configure the SI windows within the radio link measurement window through the methods in the first embodiment to the third embodiment.

In addition, the base station may include two sets of SI scheduling information in the eSIB corresponding to the pieces of SI configured within and beyond the radio link measurement window respectively. The same SIB may be transmitted through the pieces of SI within and beyond the radio link measurement window, and the SIBs included in the pieces of SI within and beyond the radio link measurement window may be the same or different from each other.

For example, the base station may configure that 2 pieces of SI are to be transmitted within the radio link measurement window, 3 pieces of SI are to be transmitted beyond the radio link measurement window, and apart from the eSIB, totally 9 SIBs need to be transmitted, i.e., SIB3/SIB4/SIB5/SIB6/SIB7/SIB8/SIB9/SIB10/SIB11. An SI-1 configured within the radio link measurement window may include SIB3/SIB4/SIB5, and an SI-2 configured within the radio link measurement window may include SIB6/SIB7/SIB8/SIB9/SIB10/SIB11. An SI-1 configured beyond the radio link measurement window may include SIB3/SIB4/SIB5, an SI-2 configured beyond the radio link measurement window may include SIB6/SIB7/SIB8, and an SI-3 may include SIB9/SIB10/SIB11. The same SIB may be received by the UE within or beyond the radio link measurement window. For example, the UE where a power-saving property is highly demanded may receive the SIB within the radio link measurement window, and the UE where a broadcasting and reception time delay is highly demanded may receive the SIB beyond the radio link measurement window.

Sixth Embodiment

Figure 11:
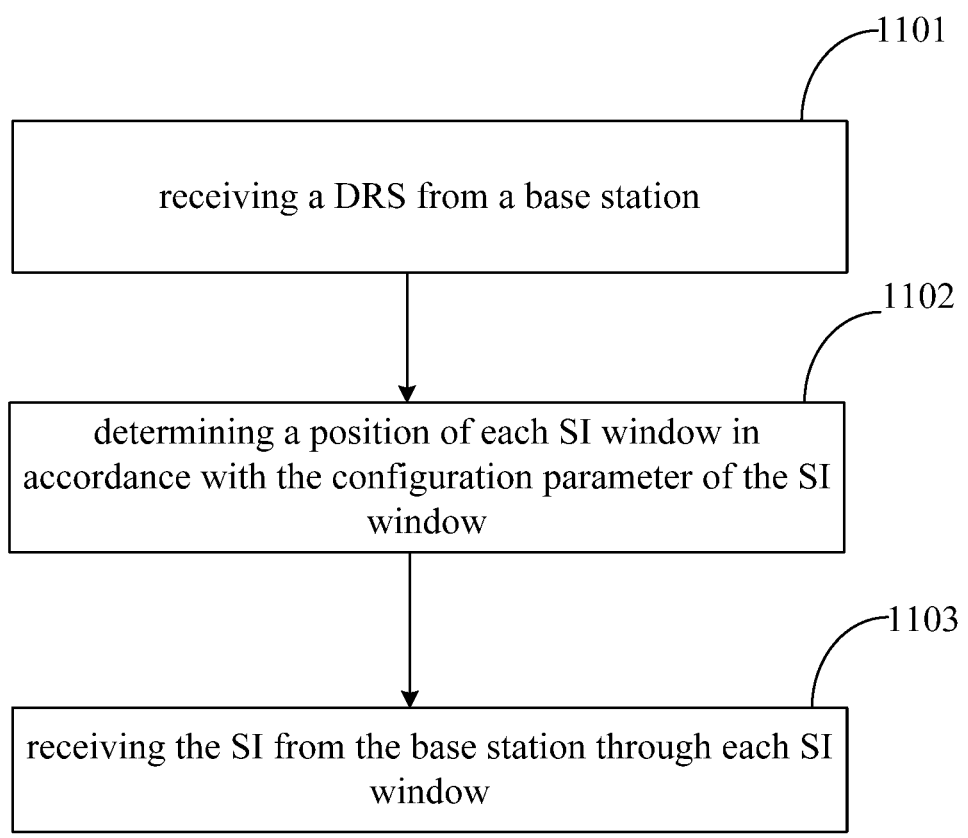
FIG. 11 is a flow chart of a method for transmitting SI according to a sixth embodiment of the present disclosure.

The present disclosure further provides in this embodiment a method for transmitting SI for use in a UE which, as shown in FIG. 11, includes the following steps.

Step 1101: receiving a DRS from a base station. A configuration parameter of an SI window corresponding to each piece of SI is carried in an eSIB in the DRS. The configuration parameter of the SI window includes a period of the SI window, a basic subframe offset of the SI window within the period, and a length of the SI window.

Step 1102: determining a position of each SI window in accordance with the configuration parameter of the SI window.

Step 1103: receiving the SI from the base station through each SI window. Each SI window corresponds to one piece of SI, and parts of the SI windows are configured in a radio link measurement window for a serving cell to which the UE belongs. The radio link measurement window includes a DMTC window and a DTxW, so the SI window for the serving cell may be configured in the DMTC window or the DTxW.

According to the sixth embodiment of the present disclosure, parts of the SI windows are configured by the base station in the DMTC window or the DTxW, so that the UE may try to receive the SI while performing the radio link measurement. As a result, it is able to reduce the power consumption of the UE, thereby to prolong a service life of a battery of the UE.

In the sixth embodiment of the present disclosure, Step 1102 may include the following four implementation modes.

In a first implementation mode, the eSIB may further include first information indicating that the SI is not transmitted within a DRS subframe. The first implementation mode may include the following steps.

In a first step, a start frame number of each SI window may be calculated through the formula: the start frame number of the SI window % T=FLOOR(x/10), where T=SI–Periodicity/10, SI–Periodicity represents the period of the SI window, and x represents the start subframe offset of the SI window within the period. To be specific, when it is necessary to calculate the start frame number of a certain SI window, the period of the SI window and the start subframe offset within the period may be substituted into the above formula.

In a second step, a start subframe number of each SI window may be calculated through the following formula: the start subframe number of the SI window=x % 10. To be specific, when it is necessary to calculate the start subframe number of a certain SI window, the start subframe offset of the SI window within the period may be substituted into the above formula.

In a third step, a start subframe offset of each SI window within the period may be calculated through the formula: $x=\text{Offset}+(n-1)*w$, where x represents the start subframe offset of the SI window within the period, Offset represents the basic subframe offset of each SI window within the period, and n represents a serial number of each SI window in an SI list and n is greater than or equal to 1, w represents the length of the SI window. To be specific, when it is necessary to calculate the start subframe offset of a certain SI window within the period, the basic subframe offset of the SI window within the period, the serial number of the SI window in the SI list, and the length of the SI window may be substituted into the above formula.

It should be appreciated that, in the first implementation mode, an order of the above steps will not be particularly defined. In addition, the UE may detect the eSIB and the SI through a same RNTI, i.e., an SI-RNTI.

In a second implementation mode, the position of each SI window may be determined in a same way as that mentioned in the first implementation mode, and a difference between the first and second implementation modes lies in that the eSIB further includes second information for indicating the UE that the eSIB and the SI are capable of being transmitted simultaneously within the DRS subframe.

In a third implementation mode, the eSIB further includes third information for indicating the UE that the eSIB and a first piece of SI are transmitted simultaneously within the DRS subframe, and fourth information for indicating the UE that the SI other than that transmitted simultaneously with the eSIB is not transmitted within the DRS subframe. The third implementation mode may include the following steps.

In a first step, the start frame number of each SI window may be calculated through the formula: the start frame number of the SI window % $T=\text{FLOOR}(x/10)$, where $T=\text{SI-Periodicity}/10$, SI-Periodicity represents the period of the of each SI window, and x represents the start subframe offset of the SI window within the period. To be specific, when it is necessary to calculate the start frame number of a certain SI window, the period of the SI window and the start subframe offset within the period may be substituted into the above formula.

In a second step, the start subframe number of each SI window may be calculated through the formula: the start subframe number of the SI window=$x \% 10$. To be specific, when it is necessary to calculate the start subframe number of a certain SI window, the start subframe offset of the SI window within the period may be substituted into the above formula.

It should be appreciated that, in the above first and second steps, the start frame number and the start subframe number of the SI window other than that corresponding to the first piece of SI are calculated.

In a third step, the start subframe offset of each SI window within the period may be calculated through the formula: $x=\text{Offset}+(n-2)*w$, where x represents the start subframe offset of each SI window within the period, Offset represents the basic subframe offset of each SI window within the period, and n represents a serial number of each SI window in an SI list and n is greater than or equal to 2, w represents the length of the SI window. To be specific, when it is necessary to calculate the start subframe offset of a certain SI window within the period, the basic subframe offset of the SI window within the period, the serial number of the SI window in the SI list, and the length of the SI window may be substituted into the above formula.

It should be appreciated that, in the second and third implementation modes, when the eSIB and the SI are scheduled by the base station through different pieces of DCI, the UE may detect the eSIB and the SI through different RNTIs or a same RNTI. When the eSIB and the SI are scheduled by the base station through the same DIC, the UE may detect the eSIB and the SI through an SI-RNTI.

In a fourth implementation mode, the eSIB further includes fifth information for indicating the UE that all the SI windows are configured in K radio link measurement windows. The configuration parameter of each SI window further includes a period of each radio link measurement window and the quantity of the SI windows configured in each of the K radio link measurement windows. Correspondingly, the fourth implementation mode may include the following steps.

In a first step, the start frame number of each SI window may be calculated through the formula: the start frame number of the SI window % $T=\text{FLOOR}(x/10)$, where $T=\text{SI-Periodicity}/10$, SI-Periodicity represents the period of each SI window, and x represents the start subframe offset of the SI window within the period. To be specific, when it is necessary to calculate the start frame number of a certain SI window, the period of the SI window and the start subframe offset within the period may be substituted into the above formula.

In a second step, the start subframe number of each SI window may be calculated through the formula: the start subframe number of the SI window=$x \% 10$. To be specific, when it is necessary to calculate the start subframe number of a certain SI window, the start subframe offset of the SI window within the period may be substituted into the above formula.

In the fourth implementation mode, the start subframe offset of each SI window within the period may be calculated in two ways, i.e., the following third step and fourth step. In other words, the third step and the fourth step are parallel to each other, and any one of them may be selected.

In the third step, the start subframe offset of each SI window within the period may be calculated through the formula: $x=\text{Offset}+(k-1)*\text{Periodicity}+(m-1)*w$, where x represents the start subframe offset of each SI window within the period, $k=\text{FLOOR}((n-1)/N2)+1$, $m=n \% N$, n represents a serial number of each SI window in an SI list and n is greater than or equal to 1, N2 represents the quantity of the SI windows configured in each of the K radio link measurement windows, m represents a serial number of each SI window in a $k^{th}$ radio link measurement window, Periodicity represents the period of each radio link measurement window, Offset represents the basic subframe offset of each SI window within the period, and w represents the length of the SI window. To be specific, when it is necessary to calculate the start subframe offset of a certain SI window within the period, the parameters of the SI window may be substituted into the above formula.

In the fourth step, a virtual start subframe offset of each SI window within the SI period may be calculated through the formula $x'=(n-1)*w$, and then the start subframe offset of each SI window may be calculated through the formula $x=\text{Offset}+x'+\text{FLOOR}((n-1)/N2)*(\text{Periodicity}-N2*w)$, where x' represents the virtual start subframe offset of each SI window within the SI period, n represents a serial number of the SI window in the SI list and n is greater than or equal to 1, w represents the length of the SI window, x represents the start subframe offset of the SI window, N2 represents the quantity of the SI windows configured in each of the K radio link measurement windows, Offset represents the basic subframe offset of the SI window within the period, and Periodicity represents the period of each radio link measurement window. To be specific, when it is necessary to calculate the start subframe offset of a certain SI window within the period, the parameters of the SI window may be substituted into the above formula.

It should be appreciated that, in the above four implementation modes, the radio link measurement window may be a DMTC window or a DTxW.

When the radio link measurement window is the DTxW, a position of the DTxW may be calculated as follows: a start frame number of the DTxW mod T=0, a start subframe number of the DTxW=0, and T=dtxw−Periodicity/10, where dtxw−Periodicity represents a period of the DTxW.

When the radio link measurement window is the DMTC window, a position of the DMTC window may be calculated as follows: a start frame number of the DMTC window mod T=FLOOR(dmtc−Offset/10), a start subframe number of the DMTC window=dmtc−Offset mod 10, and T=dmtc−Periodicity/10, where dmtc−Offset represents a subframe offset of the DMTC window within the period, and dmtc−Periodicity represents the period of the DMTC window.

Seventh Embodiment

Figure 12:
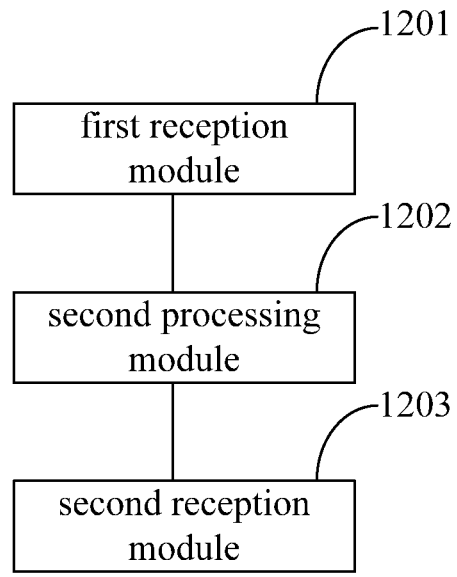
FIG. 12 is a schematic view showing a device for transmitting SI according to a seventh embodiment of the present disclosure.

The present disclosure further provides in this embodiment a device for transmitting SI for use in a UE which, as shown in FIG. 12, includes: a first reception module 1201 configured to receive a DRS from a base station, a configuration parameter of an SI window corresponding to each piece of SI being carried in an eSIB in the DRS; a second processing module 1202 configured to determine a position of each SI window in accordance with the configuration parameter of the SI window; and a second reception module 1203 configured to receive the SI from the base station through each SI window. Each SI window corresponds to one piece of SI, and parts of the SI windows are configured in a radio link measurement window for a serving cell to which the UE belongs.

In a possible embodiment of the present disclosure, the configuration parameter of each SI window includes a period of the SI window, a basic subframe offset of the SI window within the period, and a length of the SI window. The second processing module 1202 includes: an eleventh calculation unit configured to calculate a start frame number of each SI window through the formula: the start frame number of the SI window % T=FLOOR(x/10), where T=SI−Periodicity/10, SI−Periodicity represents the period of the SI window, and x represents the start subframe offset of the SI window within the period; and a twelfth calculation unit configured to calculate the start subframe number of each SI window through the formula: the start subframe number of the SI window=x % 10.

In a possible embodiment of the present disclosure, the eSIB further includes first information for indicating the UE that the SI is not transmitted within a DRS subframe, or second information for indicating the UE that both the eSIB and the SI are capable of being transmitted simultaneously within the DRS subframe. The second processing module 1202 further includes a thirteenth calculation unit configured to calculate the start subframe offset of each SI window within the period through the formula: x=Offset+(n−1)*w, where x represents the start subframe offset of the SI window within the period, Offset represents the basic subframe offset of the SI window within the period, n represents a serial number of the SI window in an SI list and n is greater than or equal to 1, and w represents the length of the SI window.

In a possible embodiment of the present disclosure, the eSIB further includes third information for indicating the UE that both the eSIB and a first piece of SI are transmitted simultaneously within the DRS subframe, and fourth information for indicating the UE that the SI other than that transmitted simultaneously with the eSIB is not transmitted within the DRS subframe. The second processing module 1202 further includes a fourteenth calculation unit configured to calculate the start subframe offset of each SI window within the period through the formula: x=Offset+(n−2)*w, where x represents the start subframe offset of the SI window within the period, Offset represents the basic subframe offset of the SI window within the period, n represents the serial number of the SI window in the SI list and n is greater than or equal to 2, and w represents the length of the SI window.

In a possible embodiment of the present disclosure, the eSIB further includes fifth information for indicating the UE that all the SI windows are configured in K radio link measurement windows. The configuration parameter of each SI window further includes a period of each radio link measurement window and the quantity of the SI windows configured in each of the K radio link measurement windows. The second processing module 1202 further includes: a fifteenth calculation unit configured to calculate the start subframe offset of each SI window within the period through the formula: x=Offset+(k−1)*Periodicity+(m−1)*w, where x represents the start subframe offset of the SI window within the period, k=FLOOR((n−1)/N2)+1, m=n % N, n represents the serial number of the SI window in the SI list and n is greater than or equal to 1, N2 represents the quantity of the SI windows in each of the K radio link measurement windows, m represents a serial number of each SI window in a $k^{th}$ radio link measurement window, Periodicity represents the period of each radio link measurement window, Offset represents the basic subframe offset of the SI window within the period, and w represents the length of the SI window; or a sixteenth calculation unit configured to calculate a virtual start subframe offset of each SI window within the period through the formula: x'=(n−1)*w, where x' represents the virtual start subframe offset of the SI window within the period, n represents the serial number of the SI window in the SI list and n is greater than or equal to 1, and w represents the length of the SI window, and a seventeenth calculation unit configured to calculate the start subframe offset of each SI window through the formula: x=Offset+x'+FLOOR((n−1)/N2)*(Periodicity−N2*w), where x represents the start subframe offset of the SI window, N2 represents the quantity of the SI window in each of the K radio link measurement windows, Offset represents the basic subframe offset of the SI window within the period, and Periodicity represents the period of each radio link measurement window.

In a possible embodiment of the present disclosure, the radio link measurement window is a DTxW or a DMTC window.

According to the seventh embodiment of the present disclosure, parts of the SI windows are configured by the base station in the DMTC window or the DTxW, so the UE may try to receive the SI while performing the radio link measurement. As a result, it is able to reduce the power consumption of the UE, thereby to prolong a service life of a battery of the UE.

It should be appreciated that, the device in the seventh embodiment of the present disclosure may be adopted to perform the above-mentioned method for transmitting the SI for use in the UE, i.e., the implementation of the device may refer to that of the abovementioned method, with a same or similar beneficial effect.

Eighth Embodiment

Figure 13:
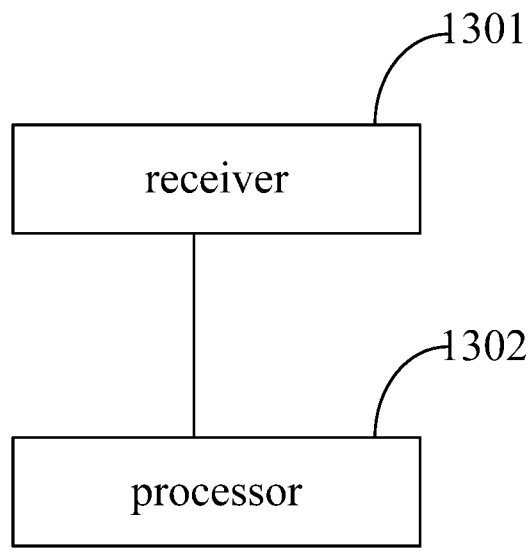
FIG. 13 is a schematic view showing a UE according to an eighth embodiment of the present disclosure.

The present disclosure further provides in this embodiment a UE which, as shown in FIG. 13, includes: a receiver 1301 configured to receive a DRS from a base station, a configuration parameter of an SI window corresponding to each piece of SI being carried in an eSIB in the DRS; and a processor 1302 connected to the receiver 1301 and configured to determine a position of each SI window in accordance with the configuration parameter of the SI window. The receiver 1301 is further configured to receive the SI from the base station through each SI window. Each SI window corresponds to one piece of SI, and parts of the SI windows are configured in a radio link measurement window for a serving cell to which the UE belongs.

According to the eighth embodiment of the present disclosure, parts of the SI windows are configured by the base station in the DMTC window or the DTxW, so the UE may try to receive the SI while performing the radio link measurement. As a result, it is able to reduce the power consumption of the UE, thereby to prolong a service life of a battery of the UE.

It should be appreciated that, the UE in this embodiment of the present disclosure may be a mobile phone (or a cellphone), or any other device capable of transmitting or receiving a radio signal, e.g., a UE (terminal), a Personal Digital Assistant (PDA), a wireless modem, a wireless communication device, a handheld device, a laptop computer, a cordless telephone, a Wireless Local Loop (WLL) station, a Customer Premise Equipment (CPE) or a mobile WiFi (Mifi) device capable of converting a mobile signal into a Wireless Fidelity (WiFi) signal, intelligent household electrical appliance, or any other device capable of spontaneously communicating with a mobile communication network.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A method for transmitting System Information (SI), used in a base station, comprising:
acquiring a configuration parameter of the radio link measurement window, determining a position of an SI window corresponding to each piece of SI in accordance with the configuration parameter of the radio link measurement window, and determining a configuration parameter of each SI window in accordance with the position of the SI window;
transmitting a Discovery Reference Signal (DRS) to a User Equipment (UE), the configuration parameter of each SI window being carried in an enhanced System Information Block (eSIB) in the DRS; and
transmitting the SI to the UE through each SI window, each SI window corresponding to one piece of SI, and parts of the SI windows being configured in a radio link measurement window for a serving cell to which the UE belongs;
wherein the configuration parameter of the radio link measurement window comprises a period of the radio link measurement window, a duration of the radio link measurement window and a subframe offset of the radio link measurement window within the period;
wherein the configuration parameter of each SI window comprises a period of the SI window, a basic subframe offset of the SI window within the period, and a length of the SI window;
wherein the acquiring the configuration parameter of the radio link measurement window, determining the position of an SI window corresponding to each piece of SI in accordance with the configuration parameter of the radio link measurement window, and determining the configuration parameter of each SI window in accordance with the position of the SI window comprises:
setting the period of each SI window as an integral multiples of the period of the radio link measurement window;
setting the subframe offset of the radio link measurement window within the period as the basic subframe offset of the SI window within the period;
calculating a start frame number of each SI window through the formula: the start frame number of the SI window % T=FLOOR(x/10), where T=SI–Periodicity/10, SI–Periodicity represents the period of the SI window, and x represents a start subframe offset of the SI window within the period; and
calculating a start subframe number of each SI window through the formula: the start subframe number of the SI window=x % 10.

2. The method according to claim 1, wherein the eSIB further comprises first information for indicating the UE that the SI is not transmitted within a DRS subframe, or second information for indicating the UE that both the eSIB and the SI are transmitted simultaneously within the DRS subframe.

3. The method according to claim 2, wherein the determining the position of the SI window corresponding to each piece of SI and determining the configuration parameter of each SI window in accordance with the position of the SI window further comprises:
calculating the length of each SI window through the formula: w=FLOOR (Duration/N1), where w represents the length of the SI window, Duration represents a duration of the radio link measurement window, and N1 represents the quantity of the SI windows configured in the radio link measurement window; and
calculating a start subframe offset of each SI window within the period through the formula: x=Offset+(n−1)*w, where Offset represents the basic subframe offset of the SI window within the period, and n represents a serial number of the SI window in an SI list and n is greater than or equal to 1.

4. The method according to claim 1, wherein the eSIB further comprises third information for indicating the UE that both the eSIB and a first piece of SI are transmitted simultaneously within the DRS subframe, and fourth information for indicating the UE that the SI other than that transmitted simultaneously with the eSIB is not transmitted within the DRS subframe.

5. The method according to claim 4, wherein the determining the position of the SI window corresponding to each piece of SI and determining the configuration parameter of each SI window in accordance with the position of the SI window further comprises:

calculating the length of each SI window through the formula: w=FLOOR (Duration/(N1−1)), where w represents the length of the SI window, Duration represents the duration of the radio link measurement window, and N1 represents the quantity of the SI windows configured in the radio link measurement window; and calculating the start subframe offset of each SI window within the period through the formula: x=Offset+(n−2)*w, where x represents the start subframe offset of the SI window within the period, Offset represents the basic subframe offset of the SI window within the period, and n represents the serial number of the SI window in the SI list and n is greater than or equal to 2.

6. The method according to claim 2, wherein when the eSIB and the SI are transmitted simultaneously within the DRS subframe, Downlink Control Information (DCI) corresponding to the eSIB is the same as, or different from, DCI corresponding to the SI, and when the DCI corresponding to the eSIB is different from the DCI corresponding to the SI, the DCI corresponding to the eSIB is scrambled through a same Radio Network Temporary Identity (RNTI) as, or a RNTI different from, the DCI corresponding to the SI.

7. The method according to claim 1, wherein the radio link measurement window is a DRS Transmission Window (DTxW) or a Discovery Signals Measurement Timing Configuration (DMTC) window.

8. A method for transmitting System Information (SI), used in a User Equipment (UE), comprising:

receiving a Discovery Reference Signal (DRS) from a base station, a configuration parameter of an SI window corresponding to each piece of SI being carried in an enhanced System Information Block (eSIB) in the DRS;

determining a position of each SI window in accordance with the configuration parameter of the SI window; and receiving the SI from the base station through each SI window, each SI window corresponding to one piece of SI, and parts of the SI windows being configured in a radio link measurement window for a serving cell to which the UE belongs, wherein a configuration parameter of the radio link measurement window comprises a period of the radio link measurement window, a duration of the radio link measurement window and a subframe offset of the radio link measurement window within the period;

wherein the configuration parameter of each SI window comprises a period of the SI window, a basic subframe offset of the SI window within the period, and a length of the SI window;

wherein the configuration parameter of the SI window corresponding to each piece of SI is determined by the base station in accordance with a position of the SI window corresponding to each piece of SI and the position of the SI window corresponding to each piece of SI is determined by the base station in accordance with the configuration parameter of the radio link measurement window in the following process:

setting the period of each SI window as an integral multiples of the period of the radio link measurement window;

setting the subframe offset of the radio link measurement window within the period as the basic subframe offset of the SI window within the period;

calculating a start frame number of each SI window through the formula: the start frame number of the SI window % T=FLOOR(x/10), where T=SI−Periodicity/10, SI−Periodicity represents the period of the SI window, and x represents a start subframe offset of the SI window within the period; and calculating a start subframe number of each SI window through the formula: the start subframe number of the SI window=x % 10.

9. The method according to claim 8, wherein the determining the position of each SI window in accordance with the configuration parameter of the SI window comprises:

calculating a start frame number of each SI window through the formula: the start frame number of the SI window % T=FLOOR(x/10), where T=SI−Periodicity/10, SI−Periodicity represents the period of the SI window, and x represents the start subframe offset of the SI window within the period; and calculating a start subframe number of each SI window through the formula: the start subframe number of the SI window=x % 10.

10. The method according to claim 9, wherein the eSIB further comprises first information for indicating the UE that the SI is not transmitted within a DRS subframe, or second information for indicating the UE that both the eSIB and the SI are capable of being transmitted simultaneously within the DRS subframe.

11. The method according to claim 10, wherein the determining the position of each SI window in accordance with the configuration parameter of the SI window further comprises calculating the start subframe offset of each SI window within the period through the formula: x=Offset+(n−1)*w, where x represents the start subframe offset of the SI window within the period, Offset represents the basic subframe offset of the SI window within the period, n represents a serial number of the SI window in an SI list and n is greater than or equal to 1, and w represents the length of the SI window.

12. The method according to claim 9, wherein the eSIB further comprises third information for indicating the UE that both the eSIB and a first piece of SI are transmitted simultaneously within the DRS subframe, and fourth information for indicating the UE that the SI other than that transmitted simultaneously with the eSIB is not transmitted within the DRS subframe.

13. The method according to claim 12, wherein the determining the position of each SI window in accordance with the configuration parameter of the SI window further comprises calculating the start subframe offset of each SI window within the period through the formula: x=Offset+(n−2)*w, where x represents the start subframe offset of the SI window within the period, Offset represents the basic subframe offset of the SI window within the period, n represents the serial number of the SI window in the SI list and n is greater than or equal to 2, and w represents the length of the SI window.

14. The method according to claim 9, wherein the eSIB further comprises fifth information for indicating the UE that all the SI windows are configured in K radio link measurement windows, and the configuration parameter of each SI window further comprises a period of each radio link measurement window and the quantity of the SI windows configured in each of the K radio link measurement windows.

15. The method according to claim 14, wherein the determining the position of each SI window in accordance with the configuration parameter of the SI window further comprises:

calculating the start subframe offset of each SI window within the period through the formula: x=Offset+(k−1)*Periodicity+(m−1)*w, where x represents the start subframe offset of the SI window within the period, k=FLOOR((n−1)/N2)+1, m=n % N, n represents the serial number of the SI window in the SI list and n is greater than or equal to 1, N2 represents the quantity of the SI windows in each of the K radio link measurement windows, m represents a serial number of each SI window in a $k^{th}$ radio link measurement window, Periodicity represents the period of each radio link measurement window, Offset represents the basic subframe offset of the SI window within the period, and w represents the length of the SI window; or calculating a virtual start subframe offset of each SI window within the period through the formula: x'=(n−1)*w, where x' represents the virtual start subframe offset of the SI window within the period, n represents the serial number of the SI window in the SI list and n is greater than or equal to 1, and w represents the length of the SI window, and calculating the start subframe offset of each SI window through the formula: x=Offset+x'+FLOOR((n−1)/N2)*(Periodicity—N2*w), where x represents the start subframe offset of the SI window, N2 represents the quantity of the SI window in each of the K radio link measurement windows, Offset represents the basic subframe offset of the SI window within the period, and Periodicity represents the period of each radio link measurement window.

16. The method according to claim 8, wherein the radio link measurement window is a DTxW or a DMTC window.

17. A User Equipment (UE), comprising:

a receiver configured to receive a Discovery Reference Signal (DRS) from a base station, a configuration parameter of an System Information (SI) window corresponding to each piece of SI being carried in an enhanced System Information Block (eSIB) in the DRS; and a processor connected to the receiver and configured to determine a position of each SI window in accordance with the configuration parameter of the SI window, wherein the receiver is further configured to receive the SI from the base station through each SI window, wherein each SI window corresponds to one piece of SI, and parts of the SI windows are configured in a radio link measurement window for a serving cell to which the UE belongs, wherein a configuration parameter of the radio link measurement window comprises a period of the radio link measurement window, a duration of the radio link measurement window and a subframe offset of the radio link measurement window within the period;

wherein the configuration parameter of each SI window comprises a period of the SI window, a basic subframe offset of the SI window within the period, and a length of the SI window;

wherein the configuration parameter of the SI window corresponding to each piece of SI is determined by the base station in accordance with a position of the SI window corresponding to each piece of SI and the position of the SI window corresponding to each piece of SI is determined by the base station in accordance with the configuration parameter of the radio link measurement window in the following process:

setting the period of each SI window as an integral multiples of the period of the radio link measurement window;

setting the subframe offset of the radio link measurement window within the period as the basic subframe offset of the SI window within the period;

calculating a start frame number of each SI window through the formula: the start frame number of the SI window % T=FLOOR(x/10), where T=SI-Periodicity/10, SI-Periodicity represents the period of the SI window, and x represents a start subframe offset of the SI window within the period; and calculating a start subframe number of each SI window through the formula: the start subframe number of the SI window=x % 10.

* * * * *